(12) United States Patent
Tokita et al.

(10) Patent No.: US 8,531,766 B2
(45) Date of Patent: Sep. 10, 2013

(54) POLARIZATION-SEPARATION DEVICE, OPTICAL SCANNING APPARATUS, AND IMAGE FORMING APPARATUS

(75) Inventors: Toshiaki Tokita, Kanagawa (JP); Nobuaki Kubo, Tokyo (JP); Kenichiro Saisho, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 433 days.

(21) Appl. No.: 12/826,237

(22) Filed: Jun. 29, 2010

(65) Prior Publication Data

US 2011/0002025 A1 Jan. 6, 2011

(30) Foreign Application Priority Data

Jul. 2, 2009 (JP) .................................. 2009-157665
Oct. 16, 2009 (JP) .................................. 2009-238991

(51) Int. Cl.
*G02B 5/30* (2006.01)

(52) U.S. Cl.
USPC ................... 359/489.08; 359/489.09

(58) Field of Classification Search
USPC ................... 359/204.3, 207.8, 207.9, 489.08, 359/489.09
See application file for complete search history.

(56) References Cited

U.S. PATENT DOCUMENTS

| | | | |
|---|---|---|---|
| 5,668,590 A | 9/1997 | Maruo et al. | |
| 6,366,403 B1 * | 4/2002 | Kurtz et al. | 359/485.06 |
| 6,643,063 B2 * | 11/2003 | Gu | 359/484.07 |
| 7,245,430 B2 | 7/2007 | Kobayashi et al. | |
| 7,417,777 B2 | 8/2008 | Saisho et al. | |
| 7,545,547 B2 | 6/2009 | Hayashi et al. | |
| 7,616,364 B2 | 11/2009 | Saisho et al. | |
| 2005/0174639 A1 * | 8/2005 | Zalevsky et al. | 359/484 |
| 2006/0284968 A1 | 12/2006 | Hayashi et al. | |
| 2007/0211326 A1 | 9/2007 | Saisho et al. | |
| 2007/0216316 A1 | 9/2007 | Hirano et al. | |
| 2007/0253048 A1 | 11/2007 | Sakai et al. | |
| 2008/0025759 A1 | 1/2008 | Ichii et al. | |
| 2008/0068689 A1 | 3/2008 | Saisho et al. | |
| 2008/0068693 A1 | 3/2008 | Hayashi et al. | |
| 2008/0123159 A1 | 5/2008 | Hayashi et al. | |
| 2008/0218827 A1 | 9/2008 | Watanabe et al. | |
| 2008/0219601 A1 | 9/2008 | Arai et al. | |
| 2009/0052944 A1 | 2/2009 | Kubo et al. | |
| 2009/0058979 A1 | 3/2009 | Saisho et al. | |
| 2009/0059337 A1 | 3/2009 | Saisho | |
| 2009/0060583 A1 | 3/2009 | Amada et al. | |
| 2009/0080907 A1 | 3/2009 | Hagiya et al. | |

(Continued)

FOREIGN PATENT DOCUMENTS

| | | |
|---|---|---|
| JP | 60-32019 A | 2/1985 |
| JP | 07-144434 A | 6/1995 |
| JP | 2007-279670 A | 10/2007 |

*Primary Examiner* — Frank Font
(74) *Attorney, Agent, or Firm* — Dickstein Shapiro LLP

(57) ABSTRACT

A polarization-separation device includes: a beam splitter that includes a beam-separating surface, on which a light beam that contains a first light beam and a second light beam impinges, wherein polarization direction of the first light beam and polarization direction of the second light beam are perpendicular to each other, and incident angle of the first light beam and incident angle of the second beam vary independently while incident into the beam-separating surface; a first polarizer arranged in an optical path of light beams having transmitted through the beam splitter, and allows the first light beam to transmit therethrough; and a second polarizer arranged in an optical path of light beams reflected from the beam splitter, and allows the second light beam to transmit therethrough.

25 Claims, 29 Drawing Sheets

(56) References Cited

U.S. PATENT DOCUMENTS

| | | |
|---|---|---|
| 2009/0195636 A1 | 8/2009 | Arai et al. |
| 2009/0220256 A1 | 9/2009 | Suhara et al. |
| 2009/0231557 A1 | 9/2009 | Kubo |
| 2010/0060710 A1 | 3/2010 | Kubo |
| 2010/0060963 A1 | 3/2010 | Miyake et al. |
| 2010/0118366 A1 | 5/2010 | Tokita et al. |

* cited by examiner

|  | P1 | P2 | P3 |
| --- | --- | --- | --- |
| DEFLECTION ANGLE [deg.] | 0 | 35.3 | 40.0 |
| INCIDENT ANGLE [deg.] | 30 | 45.0 | 48.4 |
| $\theta 1$ [deg.] | 0 | 45.0 | 48.1 |
| $\theta 2$ [deg.] | 90 | 45.0 | 41.9 |

|  | P1 | P2 |
|---|---|---|
| DEFLECTION ANGLE [deg.] | 0 | 40.0 |
| INCIDENT ANGLE [deg.] | 60 | 67.5 |
| $\theta 1$ [deg.] | 0 | 20.4 |
| $\theta 2$ [deg.] | 90 | 69.6 |

POLARIZATION-SEPARATION DEVICE, OPTICAL SCANNING APPARATUS, AND IMAGE FORMING APPARATUS

CROSS-REFERENCE TO RELATED APPLICATIONS

The present application claims priority to and incorporates by reference the entire contents of Japanese Patent Application No. 2009-157665 filed in Japan on Jul. 2, 2009 and Japanese Patent Application No. 2009-238991 filed in Japan on Oct. 16, 2009.

BACKGROUND OF THE INVENTION

1. Field of the Invention

The present invention is directed generally to polarization-separation device, optical scanning apparatus, and image forming apparatus. More particularly, the invention is directed to a polarization-separation device that separates light beams with different polarization directions, an optical scanning apparatus with use of the polarization-separation device, and an image forming apparatus that includes the optical scanning apparatus.

2. Description of the Related Art

Image forming apparatuses that record electrophotographic images with laser light have become widespread. Such an image forming apparatus typically includes an optical scanning apparatus that scans a surface of a photosensitive drum with laser light by using a deflector (e.g., a polygon mirror) in the axial direction of the drum being rotated to thereby form a latent image on the surface of the drum.

Upon proliferation of high-speed and color image forming in recent years, tandem image forming apparatuses that include a plurality of (typically, four) photosensitive drums have become widespread use recent years.

Tandem image forming apparatuses are likely to be upsized so as to increase the number of the drums that are used therein. Constructing units, such as an optical scanning apparatus, of an image forming apparatus compact has been desired. For compact construction, it is effective to superimpose a plurality of optical paths of scanning light beams traveling from a deflector to photosensitive drums.

For instance, disclosed is a recording apparatus that includes two laser light sources that emit two linearly-polarized laser beams, of which polarization directions are perpendicular to each other and which have undergone brightness modulation according to signals to be recorded, a polarized-light combining unit that combines the two laser light beams emitted by the laser light sources together, a deflecting unit that deflects thus-combined laser beams in the main-scanning direction, and a polarization-separation unit that separates the combined laser beams deflected by the deflecting unit so as to impinge on different spots on a scanning-recording surface in Japanese Patent Application Laid-open No. S60-32019.

Further disclosed is an optical scanning apparatus that includes a single laser light source that emits laser light, an information control unit that supplies different information pieces to two polarized-light beams obtained by polarization of the laser light from the light source, a polarization control unit that controls a degree of polarization based on information piece fed from the information control unit, a scanning unit that scans a predetermined to-be-illuminated surface with the light beam polarized by the degree determined by the polarization control unit, a separation unit that separates the light beams undergone scanning into two light beams depending on each state of polarization, and an optical-rotation control unit that controls rotation of incident laser light from the scanning unit depending on an angle of incidence on the separation unit in Japanese Patent Application Laid-open No. H7-144434.

Still further disclosed is an optical scanning apparatus that includes a light source, an optical deflector that includes a plurality of deflective reflection surfaces arranged in a sub-scanning direction, a light-beam-splitting diffractive optical element that splits a light beam from the light source into a plurality of light beams each impinging on a corresponding one of the deflective reflection surfaces, and a scanning optical system that causes the light beams deflected by the optical deflector to be converged on a surface to be scanned in Japanese Patent Application Laid-open No. 2007-279670.

However, the recording apparatus disclosed in Japanese Patent Application Laid-open No. S60-32019 is disadvantageous in that electric-field vectors of polarized light, which is expected to transmit through the polarization-separation unit, are not in some cases parallel to the incidence plane on a polarization-separating surface, causing part of the light that is expected to transmit through the polarization-separation unit to be undesirably reflected from the polarization-separation unit.

The optical scanning apparatus disclosed in Japanese Patent Application Laid-open No. H7-144434 is disadvantageous in that employment of a magnetic optical element as the optical-rotation control unit leads to higher cost. The optical scanning apparatus is also disadvantageous in that performing the optical rotation control results in increase in power consumption and amount of heat to be liberated. The optical scanning apparatus is also disadvantageous in that it is difficult to control the optical scanning apparatus so as to provide its performance stably, because the angle of optical rotation is susceptible to environmental changes such as temperature changes.

SUMMARY OF THE INVENTION

It is an object of the present invention to at least partially solve the problems in the conventional technology.

According to an aspect of the present invention, there is provided a polarization-separation device including: a beam splitter that includes a beam-separating surface, on which a light beam that contains a first light beam and a second light beam impinges, wherein polarization direction of the first light beam and polarization direction of the second light beam are perpendicular to each other, and incident angle of the first light beam and incident angle of the second beam vary independently while incident into the beam-separating surface; a first polarizer arranged in an optical path of light beams having transmitted through the beam splitter, and allows the first light beam to transmit therethrough; and a second polarizer arranged in an optical path of light beams reflected from the beam splitter, and allows the second light beam to transmit therethrough.

According to still another aspect of the present invention, there is provided an optical scanning apparatus that scans a plurality of scanned surfaces with light beams, the optical scanning apparatus including: a light source unit that emits a plurality of light beams that include a first light beam and a second light beam, wherein polarization direction of the first light beam and polarization direction of the second light beam are perpendicular to each other; a deflector that deflects the light beams from the light source unit; and a scanning optical system that includes the polarization-separation device and separates the light beams deflected by the deflector by using the polarization-separation device so as to cause each of the light beams to be converged on a corresponding one of the scanned surfaces.

According to still another aspect of the present invention, there is provided an image processing apparatus including: a plurality of image carriers; and the optical scanning apparatus that scans the image carriers with light beams.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Described below are exemplary embodiments of the present invention with reference to the accompanying drawings.

First Embodiment

Figure 1:
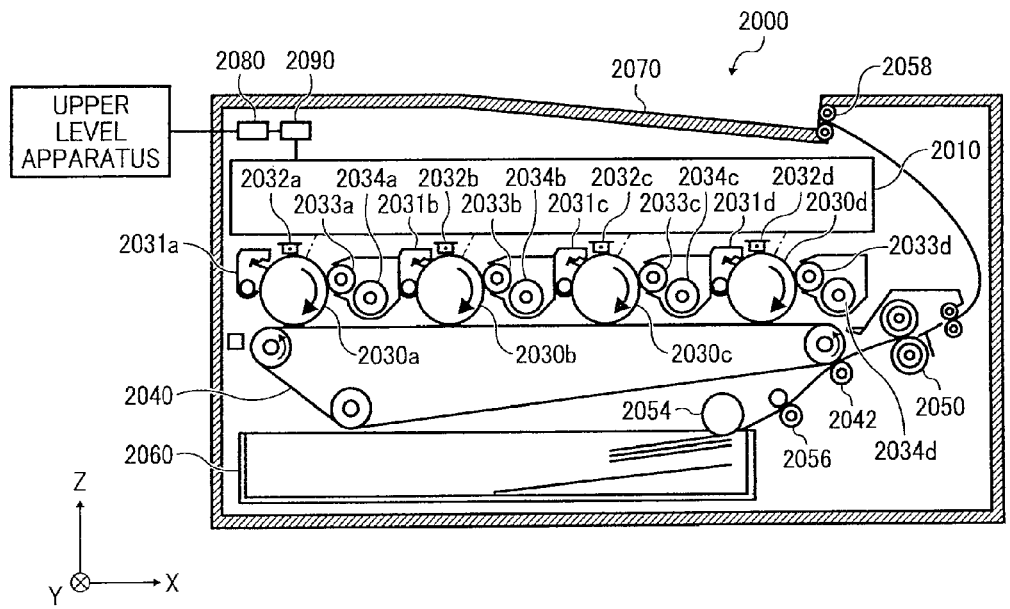
FIG. 1 is a diagram schematically illustrating the configuration of a color printer according to an embodiment of the present invention.

A first embodiment of the present invention is described below with reference to FIG. 1 to FIG. 41. FIG. 1 is a diagram schematically illustrating the configuration of a color printer 2000, which is an image forming apparatus according to the first embodiment.

The color printer 2000 is a tandem multiple-color printer that forms a full-color image by superimposing images of four colors (black, cyan, magenta, and yellow) on one another. The color printer 2000 includes an optical scanning apparatus 2010, four photosensitive drums (2030a, 2030b, 2030c, and 2030d), four cleaning units (2031a, 2031b, 2031c, and 2031d), four electrostatic chargers (2032a, 2032b, 2032c, and 2032d), four developing rollers (2033a, 2033b, 2033c, and 2033d), four toner cartridges (2034a, 2034b, 2034c, and 2034d), a transfer belt 2040, a transfer roller 2042, a pair of fixing rollers 2050, a sheet feed roller 2054, a pair of registration rollers 2056, a pair of sheet delivery rollers 2058, a sheet feed tray 2060, a sheet output tray 2070, a communication control device 2080, and a printer control device 2090 that performs centralized control of these units.

In the description below, it is assumed that in a XYZ, three-dimensional rectangular coordinate system, a direction, in which the four photosensitive drums are arranged, is taken as the X-axis direction and the longitudinal direction of each of the photosensitive drums is taken as the Y-axis direction.

The communication control device 2080 controls communications to and from a host apparatus (e.g., a personal computer) via a network or the like.

A photosensitive layer is formed on the surface of each of the photosensitive drums. Put another way, the surface of each of the photosensitive drums is a surface to be scanned. It is assumed that each photosensitive drum is rotated by a rotating mechanism (not shown) in the plane shown in FIG. 1 in a direction indicated by arrows.

The electrostatic charger 2032a, the developing roller 2033a, and the cleaning unit 2031a are arranged near the surface of the photosensitive drum 2030a in this order in the rotating direction of the photosensitive drum 2030a.

The photosensitive drum 2030a, the electrostatic charger 2032a, the developing roller 2033a, the toner cartridge 2034a, and the cleaning unit 2031a, which are used as a set, form an image forming station that form a black image (hereinafter, referred to as "K station" for brevity in some cases).

The electrostatic charger 2032b, the developing roller 2033b, and the cleaning unit 2031b are arranged near the surface of the photosensitive drum 2030b in this order in the rotating direction of the photosensitive drum 2030b.

The photosensitive drum 2030b, the electrostatic charger 2032b, the developing roller 2033b, the toner cartridge 2034b, and the cleaning unit 2031b, which are used as a set, form an image forming station that forms a cyan image (hereinafter, referred to as "C station" for brevity in some cases).

The electrostatic charger 2032c, the developing roller 2033c, and the cleaning unit 2031c are arranged near the surface of the photosensitive drum 2030c in this order in the rotating direction of the photosensitive drum 2030c.

The photosensitive drum 2030c, the electrostatic charger 2032c, the developing roller 2033c, the toner cartridge 2034c, and the cleaning unit 2031c, which are used as a set, form an image forming station that forms a magenta image (hereinafter, referred to as "M station" for brevity in some cases).

The electrostatic charger 2032d, the developing roller 2033d, and the cleaning unit 2031d are arranged near the surface of the photosensitive drum 2030d in this order in the rotating direction of the photosensitive drum 2030d.

The photosensitive drum 2030d, the electrostatic charger 2032d, the developing roller 2033d, the toner cartridge 2034d, and the cleaning unit 2031d, which are used as a set, form an image forming station that forms a yellow image (hereinafter, referred to as "Y station" for brevity in some cases).

Each of the electrostatic chargers causes the surface of a corresponding one of the photosensitive drums to be uniformly electrostatically charged.

The optical scanning apparatus 2010 illuminates the surfaces of the photosensitive drums with the light beams modulated on a color-by-color basis according to multiple-color image data (black image data, cyan image data, magenta image data, and yellow image data) fed from the host apparatus. As a result, electric charges charged on the surface of each of the photosensitive drums are drained away only from areas illuminated with light, causing a latent image to be formed on the surface of each of the photosensitive drums according to the image data. The thus-formed latent image is moved toward a corresponding one of the developing rollers as the photosensitive drum rotates. The configuration of the optical scanning apparatus 2010 will be descried later.

Black toner, which is to be supplied to the developing roller 2033a, is contained in the toner cartridge 2034a. Cyan toner, which is to be supplied to the developing roller 2033b, is contained in the toner cartridge 2034b. Magenta toner, which is to be supplied to the developing roller 2033c, is contained in the toner cartridge 2034c. Yellow toner, which is to be supplied to the developing roller 2033d, is contained in the toner cartridge 2034d.

As each of the developing rollers rotates, toner is uniformly and lightly applied onto the surface of the developing roller from a corresponding one of the toner cartridges. When the developing roller comes into contact with the surface of the corresponding photosensitive drum, the toner on the surface of the developing roller is transferred only onto the illuminated areas of the surface and sticks thereto. Put another way, each of the developing rollers applies toner onto the latent image formed on the surface of the corresponding photosensitive drum, thereby developing the latent image into a visible image. The image to which toner sticks (hereinafter, "toner image") moves toward the transfer belt 2040 as the photosensitive drum rotates.

The toner images of yellow, magenta, cyan, and black are sequentially transferred onto the transfer belt 2040 to be superimposed on one another at predetermined timing, whereby a full-color image is formed. The direction in which toner images move on the transfer belt 2040 is referred to as "sub direction" (sub-scanning direction) while the direction (in FIG. 1, the Y-axis direction) perpendicular to the sub direction is referred to as "main direction" (main-scanning direction).

One or more sheets of recording medium are contained in the sheet feed tray 2060. The sheet feed roller 2054 is arranged near the sheet feed tray 2060. The sheet feed roller 2054 picks up a sheet of the recording medium (hereinafter, "recording sheet") at a time from the sheet feed tray 2060 and feeds the recording sheet to the registration rollers 2056. The registration rollers 2056 feed the recording sheet toward a nip between the transfer belt 2040 and the transfer roller 2042 at predetermined timing. This causes the full-color image on the transfer belt 2040 to be transferred onto the recording sheet. The recording sheet onto which the image has been transferred is fed to the fixing rollers 2050.

The fixing rollers 2050 apply heat and pressure to the sheet, thereby fixing the toner onto the sheet. The sheet having undergone fixing is delivered to the sheet output tray 2070 by the sheet delivery rollers 2058 to be stacked on the sheet output tray 2070 in the delivered order.

Each of the cleaning units removes toner (residual toner) that remains on the surface of a corresponding one of the photosensitive drums. The surface, from which the residual toner has been removed, of the photosensitive drum returns to a position where the surface faces a corresponding one of the electrostatic chargers.

The configuration of the optical scanning apparatus 2010 will be described below.

Figure 2:
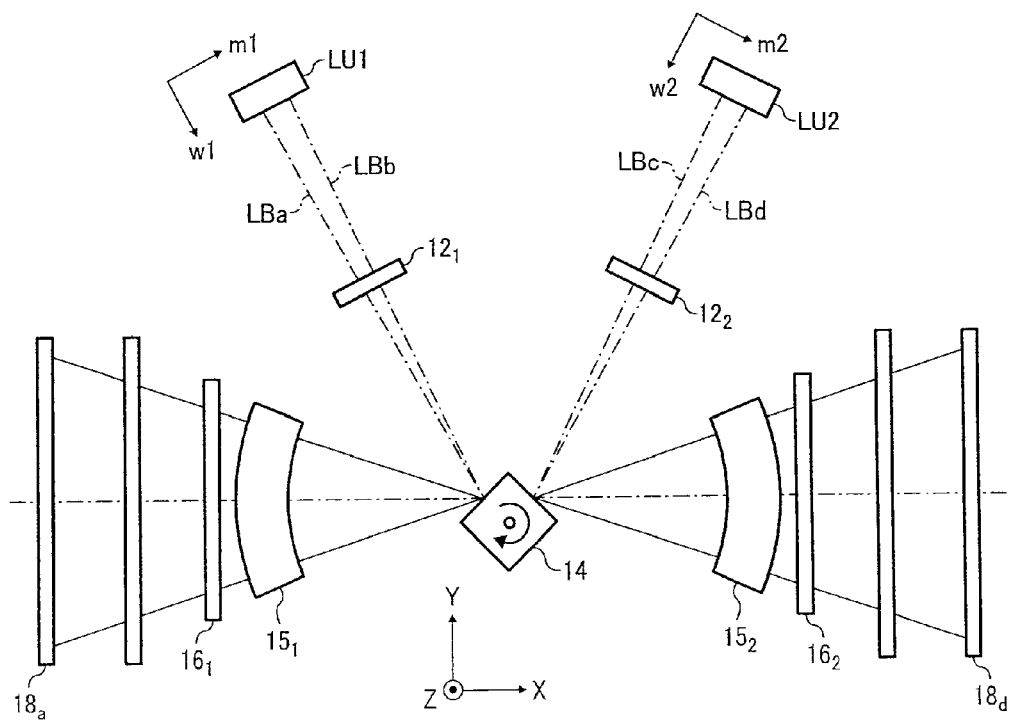
FIG. 2 is a schematic diagram for describing an optical scanning apparatus.
Figure 3:
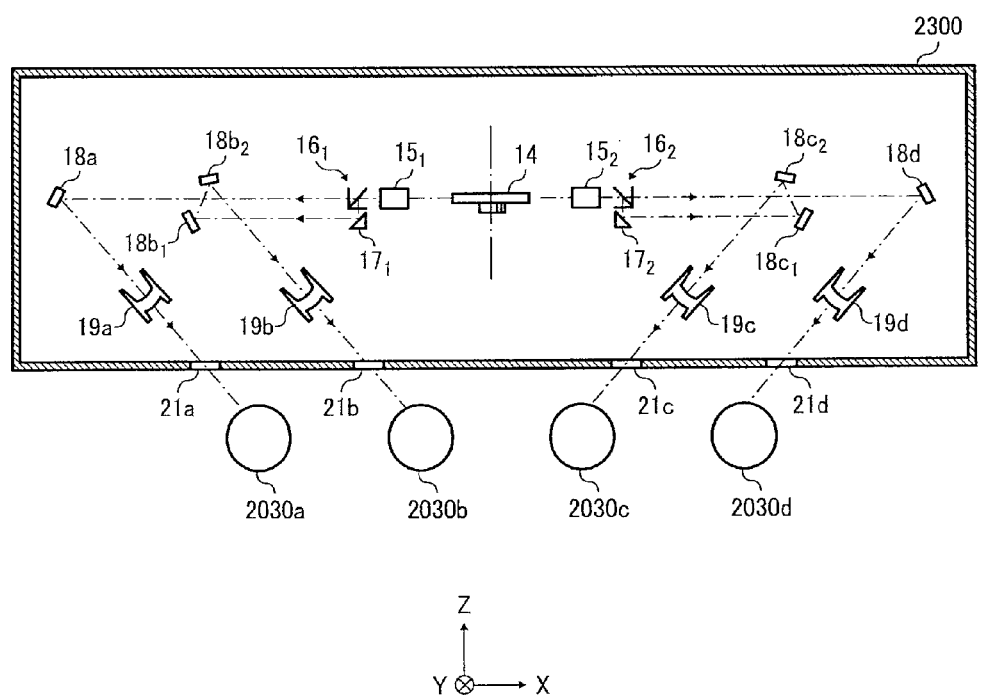
FIG. 3 is another schematic diagram for describing the optical scanning apparatus.

As shown in FIG. 2 and FIG. 3, for instance, the optical scanning apparatus 2010 includes two light source units (LU1 and LU2), two cylindrical lenses ($12_1$ and $12_2$), a polygon mirror 14, two fθ lenses ($15_1$ and $15_2$), two polarization-separation devices ($16_1$ and $16_2$), two reflecting mirrors ($17_1$ and $17_2$), a plurality of reflection mirrors ($18a$, $18b_1$, $18b_2$, $18c_1$, $18c_2$, and $18d$), four anamorphic lenses ($19a$, $19b$, $19c$, and $19d$), and a scanning control device (not shown). These are assembled to an optical housing 2300 (omitted from FIG. 2 but shown in FIG. 3) at predetermined positions.

The optical housing 2300 has four exit windows ($21a$, $21b$, $21c$, and $21d$). A transparent member made of glass or resin is attached to each of the exit windows.

In the description below, direction corresponding to the main-scanning direction is simply referred as "main-scanning-corresponding direction" while a direction corresponding to the sub-scanning direction is simply referred to as "sub-scanning-corresponding direction."

The light source unit LU1 and the light source unit LU2 are arranged to be away from each other in the X-axis direction. The main-scanning-corresponding direction for the light source unit LU1 is referred to as "m1 direction", while the main-scanning-corresponding direction for the light source unit LU2 is referred to as "m2 direction."

The direction of the optical axis of the cylindrical lens $12_1$ is referred to as "w1 direction" while the direction of the optical axis of the cylindrical lens $12_2$ is referred to as "w2 direction."

Figure 4:
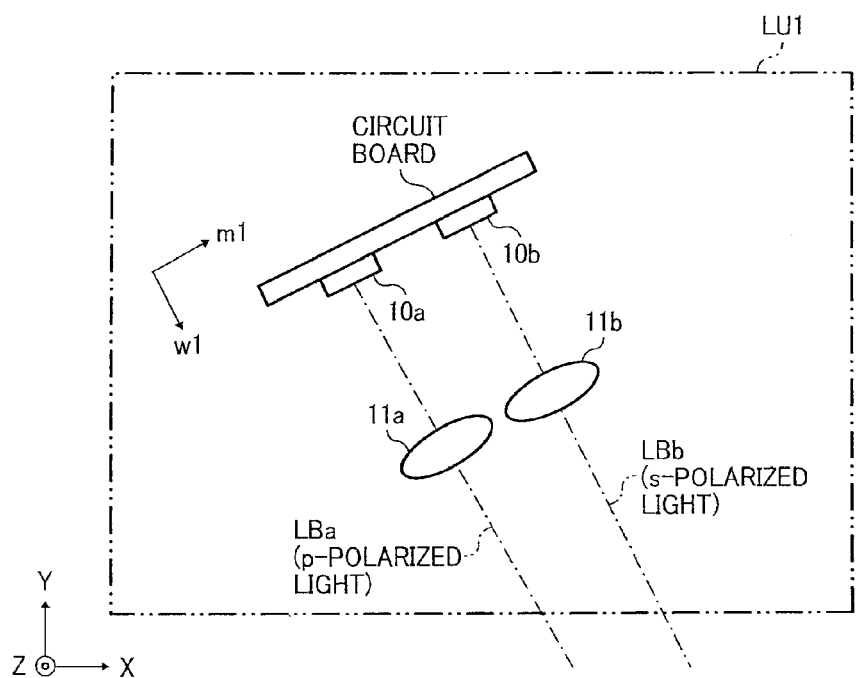
FIG. 4 is a schematic diagram for describing a light source unit LU1.

The light source unit LU1 includes, for instance, as shown in FIG. 4, two light sources ($10a$ and $10b$) and two collimator lenses ($11a$ and $11b$).

Figure 5:
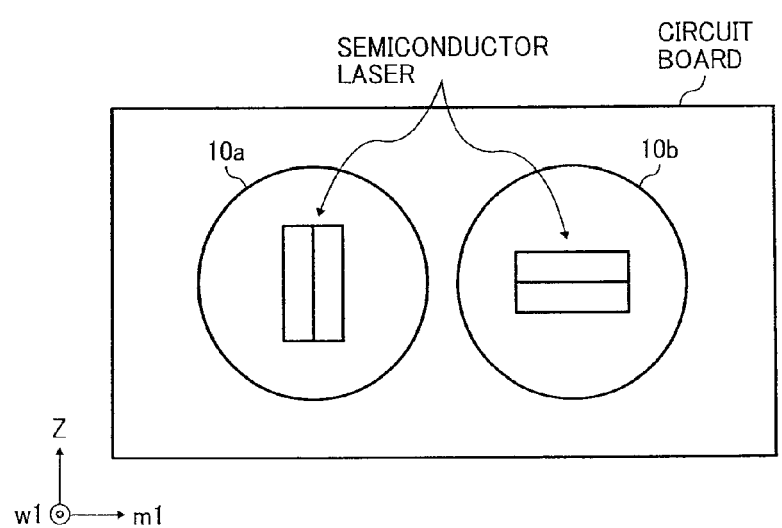
FIG. 5 is a schematic diagram for describing light sources in the light source unit LU1.

Each of the light sources $10a$ and $10b$ is a light source that includes a semiconductor laser; the semiconductor lasers of the light sources $10a$ and $10b$ are substantially identical with each other. As shown in FIG. 5, for instance, the light source $10a$ and the light source $10b$ are arranged on a circuit board such that polarization directions of light beams emitted by these two semiconductor lasers are perpendicular to each other. Put another way, one polarization direction of the two light sources is oriented to be perpendicular to the other one polarization direction. In this example, it is assumed that the light source $10a$ emits p-polarized light, while the light source $10b$ emits s-polarized light.

Referring back to FIG. 4, the collimator lens $11a$ is arranged in an optical path of light beams emitted by the light source $10a$ to collimate the light beams into substantially parallel rays. In the description below, light beams emitted by the light source $10a$ are referred to as light beams LBa in some cases.

The collimator lens lib is arranged in an optical path of light beams emitted by the light source $10b$ to collimate the light beams into substantially parallel rays. In the description below, light beams emitted by the light source $10b$ are referred to as light beams LBb in some cases.

Figure 6:
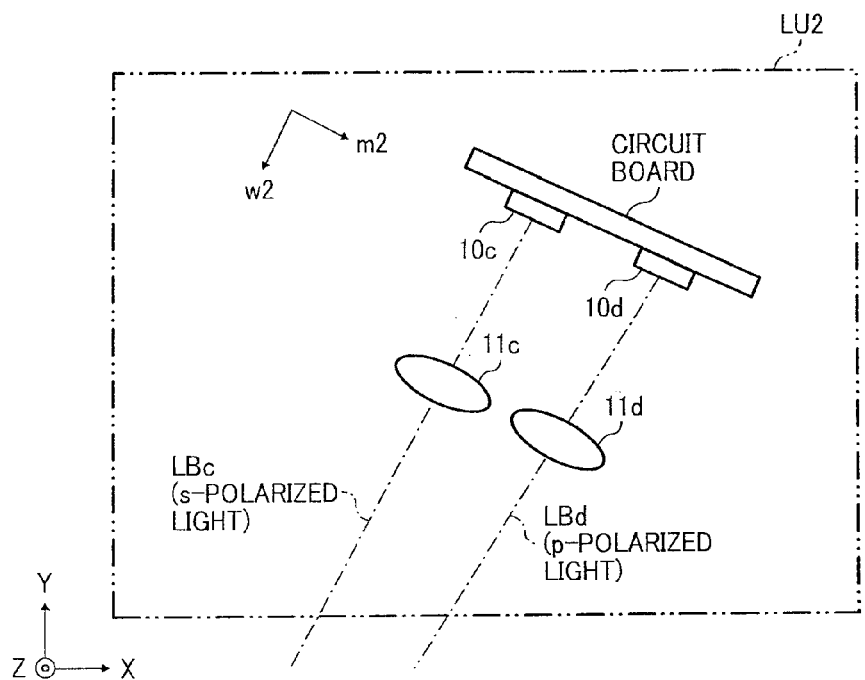
FIG. 6 is a schematic diagram for describing a light source unit LU2.

The light source unit LU2 includes, for instance, as shown in FIG. 6, two light sources ($10c$ and $10d$) and two collimator lenses ($11c$ and $11d$).

Figure 7:
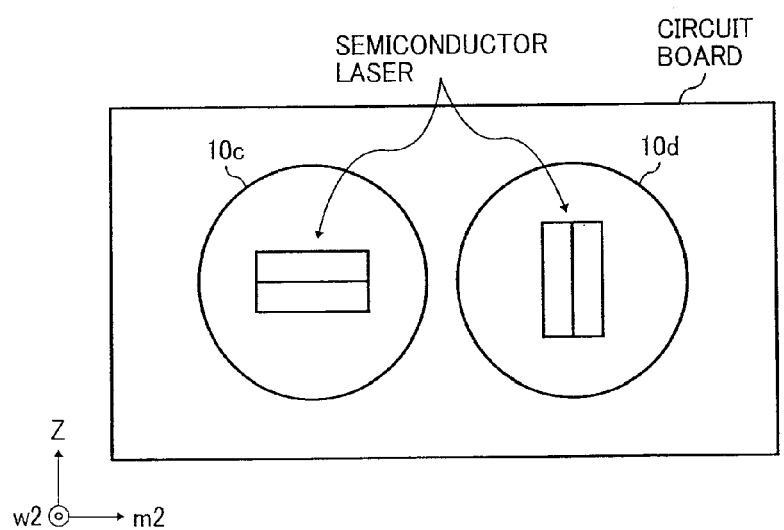
FIG. 7 is a schematic diagram for describing light sources in the light source unit LU2.

Each of the light sources $10c$ and $10d$ is a light source that includes a semiconductor laser; the semiconductor lasers of the light sources 10c and 10d are substantially identical with each other. As shown in FIG. 7, for instance, the light source 10c and the light source 10d are arranged on a circuit board such that polarization directions of light beams emitted by their semiconductor lasers are perpendicular to each other. Put another way, one polarization direction of the two light sources is oriented to be perpendicular to the other one polarization direction. In this example, it is assumed that the light source 10c emits s-polarized light while the light source 10d emits p-polarized light.

Referring back to FIG. 6, the collimator lens 11c is arranged in an optical path of light beams emitted by the light source 10c to collimate the light beams into substantially parallel rays. In the description below, light beams emitted by the light source 10c are referred to as light beams LBc in some cases.

The collimator lens 1ld is arranged in an optical path of light beams emitted by the light source 10d to collimate the light beams into substantially parallel rays. In the description below, light beams emitted by the light source 10d are referred to as light beams LBd in some cases.

Referring back to FIG. 2, the cylindrical lens $12_1$ causes each of the light beams (LBa, LBb) from the light source unit LU1 to be converged about the Z-axis direction near a deflective reflection facet of the polygon mirror 14.

The cylindrical lens $12_2$ causes each of the light beams (LBc, LBd) from the light source unit LU2 to be converged about the Z-axis direction near a deflective reflection facet of the polygon mirror 14.

The polygon mirror 14 includes, for instance, four facet mirrors each of which serves as the deflective reflection facet. The polygon mirror 14 rotates about an axis parallel to the Z-axis at a constant rotation speed and deflects light beams traveling from each of the cylindrical lenses at substantially a constant angular velocity in a plane parallel to the X-Y plane.

In this example, light beams from the cylindrical lens $12_1$ are deflected in the negative X direction relative to the polygon mirror 14, while light beams from the cylindrical lens $12_2$ are deflected in the positive X direction relative to the polygon mirror 14. Meanwhile, a light-beam plane formed with light beams deflected by the deflective reflection facets of the polygon mirror 14 at different points in time is referred to as "deflection plane" (see Japanese Patent Application Laid-open No. H11-202252). In this example, the deflection plane lies parallel to the X-Y plane.

The fθ lens $15_1$ is arranged on the negative side of the polygon mirror 14 in the X direction as well as in the optical path of the light beams passed through the cylindrical lens $12_1$ and then deflected by the polygon mirror 14.

Figure 8:
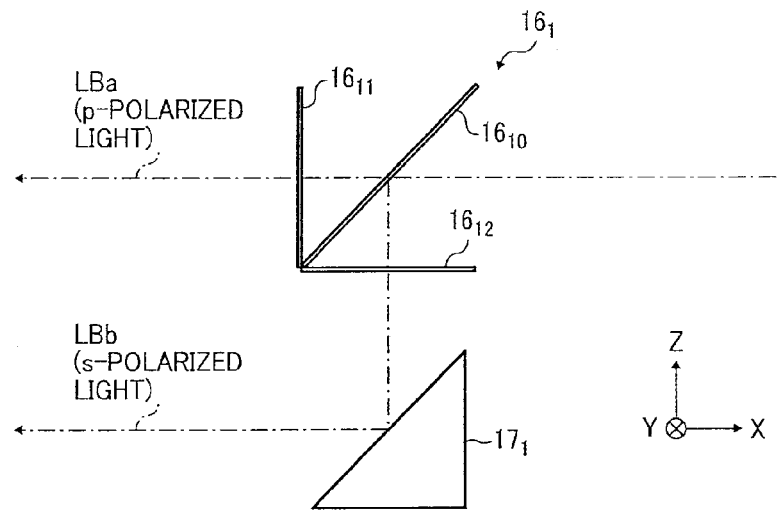
FIG. 8 is a schematic diagram for describing the configuration of a polarization-separation device $16_1$.

As shown in FIG. 8, for instance, the polarization-separation device $16_1$ includes a beam splitter $16_{10}$ and two polarizers ($16_{21}$ and $16_{12}$).

The beam splitter $16_{10}$ is arranged on the negative side of the fθ lens $15_1$ in the X direction as well as in the optical path of the light beams (the light beams LBa and the light beams LBb) passed through the fθ lens $15_1$. The beam splitter $16_{10}$ allows some of light beams incident on the beam splitter $16_{10}$ to transmit therethrough and reflects the remainder without changing polarization directions of the light beams.

Figure 9:
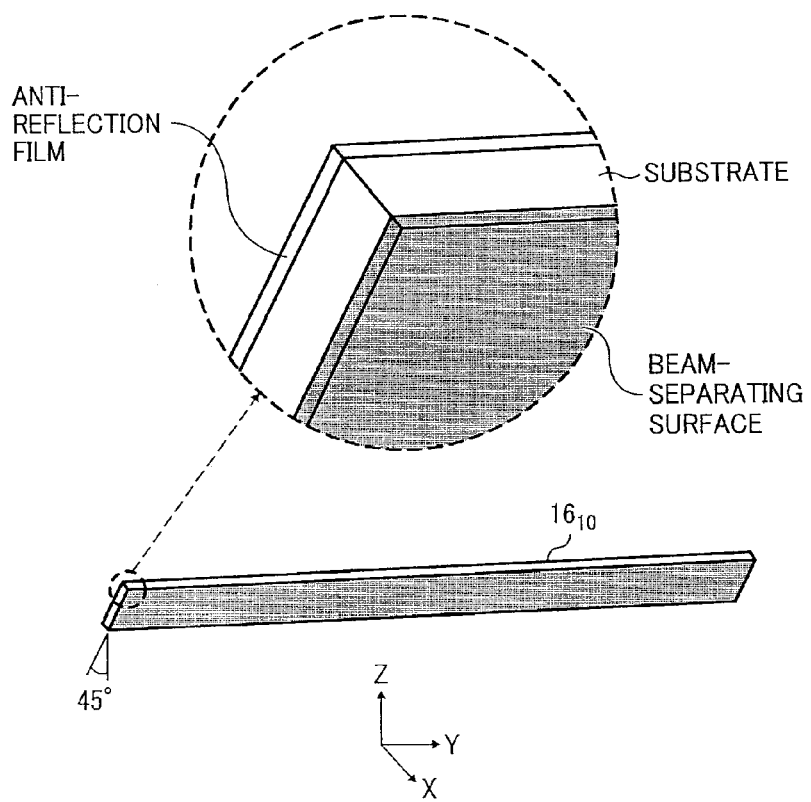
FIG. 9 is a schematic diagram for describing the configuration of a beam splitter $16_{10}$.

The beam splitter $16_{10}$ is, for instance, as shown in FIG. 9, a plate-like beam splitter that longitudinally extends in the Y-axis direction. The beam splitter $16_{10}$ is transparent substrate, such as a glass plate or a transparent resin plate, on which a beam-separating surface is formed on the positive side in the X direction. This beam-separating surface is what is called a dielectric multilayer surface, or specifically a surface on which at least two types of dielectric layers with different refractive indices are laminated. In this example, TaO and SiO are alternately laminated.

The negative side in the X direction (the other side of the beam-separating surface, or the back surface) of the substrate is coated with an anti-reflection film. This prevents the surface on the negative side in the X direction of the substrate from reflecting some of the light beams having transmitted through the beam-separating surface and producing undesired reflected light.

The beam splitter $16_{10}$ is provided such that the beam-separating surface is tilted 45 degrees relative to the deflection plane.

Figure 10:
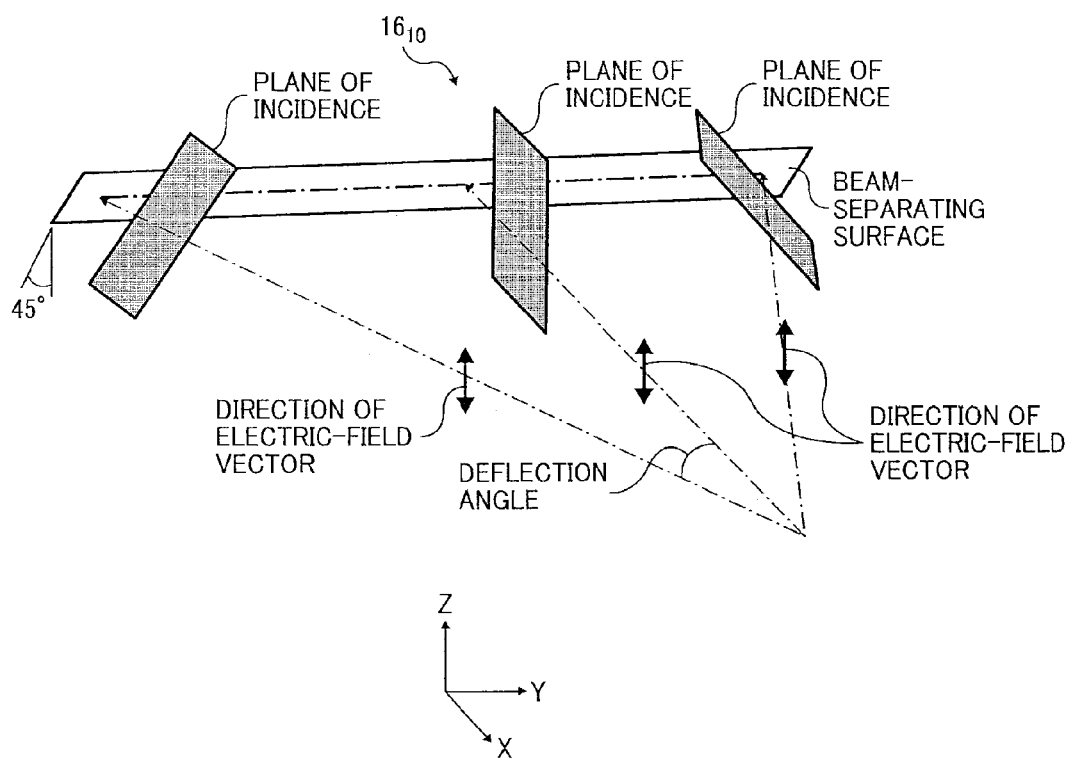
FIG. 10 is a schematic diagram for describing an incidence plane.

FIG. 10 illustrates light beams LBa incident on the beam splitter $16_{10}$. Each of the light beams LBa is linearly-polarized light whose electric-field vector is parallel to the Z-axis irrespective of the deflection angle. The incidence plane of the light beam LBa is parallel to the Z-axis when the principal ray of the light beam B is parallel to the X-axis, or put another way, when the deflection angle is 0 degrees; however, the incidence plane is tilted greater degrees relative to the Z-axis as the absolute value of the deflection angle increases.

Polarization component parallel to the incidence plane is p-polarized component, while polarization component perpendicular to the p-polarized component is s-polarized component. A light beam LBa incident on the beam splitter $16_{10}$ contains only p-polarized component, when the deflection angle is 0 degrees; however, as the absolute value of the deflection angle increases, the ratio of the p-polarized component decreases and the ratio of the s-polarized component increases.

Meanwhile, the incident angles of a light beam incident on the beam splitter $16_{10}$ are: 45.0 degrees when the deflection angle is 0 degrees; and 57.2 degrees when the deflection angle is +40 degrees or −40 degrees. Accordingly, when scanning of the surface of the photosensitive drum is to be performed with the deflection angle in a range of from −40 to +40 degrees, an effective range of incident angle for the polarization-separation device $16_1$ is from 45.0 to 57.2 degrees.

In the case where the angle between the polarization directions is parallel to the Z-axis, the angle between the incidence plane and the deflection is 0 degrees when the deflection angle is 0 degrees; and 32.7 degrees when the deflection angle is +40 degrees. In contrast, in the case where the polarization direction is perpendicular to the Z-axis, the angle between incidence plane and the deflection direction is 90 degrees when the deflection angle is 0 degrees; and 57.2 degrees when the deflection angle is +40 degrees.

In the description below, a light beam whose polarization direction is parallel to the Z-axis is referred to as light beam A; an angle between this polarization direction and the incidence plane is referred to as θ1 for convenience. Similarly, a light beam whose polarization direction is perpendicular to the Z-axis is referred to as light beam B; an angle between this polarization direction and the incidence plane is referred to as θ2.

Described below are the relation between transmittance through a beam splitter and direction of electric-field vector of light having transmitted through the beam splitter, and relation between reflectance from the beam splitter and direction of electric-field vector of light reflected from the beam splitter. Transmittance of p-polarized component through a beam-separating surface is denoted as Tp, reflectance of the p-polarized component from the same is denoted as Rp, transmittance of s-polarized component through the same is denoted as Ts, and reflectance of the s-polarized component from the same is denoted as Rs. Note that optical phase difference is not taken into account here.

(1) Case where Tp is Equal to Ts

In this case, a light beam incident on the beam splitter does not undergo directional change of the electric-field vector while the light beam passes through the beam splitter. Accordingly, when, for instance, the light beam A enters the beam splitter, linearly-polarized light, whose electric-field vector lies in the Z-axis direction, is obtained as outgoing light from the beam splitter.

(2) Case where Tp Differs from Ts

In this case, a light beam incident on the beam splitter undergoes rotation of the direction of the electric-field vector while the light beam passes through the beam splitter. When, for extreme example, Ts is zero, a light beam that exits the beam splitter contains only p-polarized component.

(3) Case where Rp is Equal to Rs

In this case, a light beam incident on the beam splitter does not undergo directional change of the electric-field vector when the light beam is reflected from the beam splitter.

(4) Case where Rp Differs from Rs

In this case, a light beam incident on the beam splitter undergoes rotation of the direction of the electric-field vector when the light beam is reflected from the beam splitter.

Meanwhile, with an actual beam splitter, it is difficult to cause both Tp=Ts and Rp=Rs to be satisfied at every incident angle.

In the first embodiment, the beam-separating surface is tilted 45 degrees relative to the deflection plane. In this situation, $\theta 1$ can be any value in a range of from 0 to 45 degrees, and $\theta 2$ can be any value in the range of from 90 to 45 degrees. Although it is practically impossible to have the deflection angle of 90 degrees, in a condition that is close thereto, each of $\theta 1$ and $\theta 2$ approaches 45 degrees.

Figure 11:
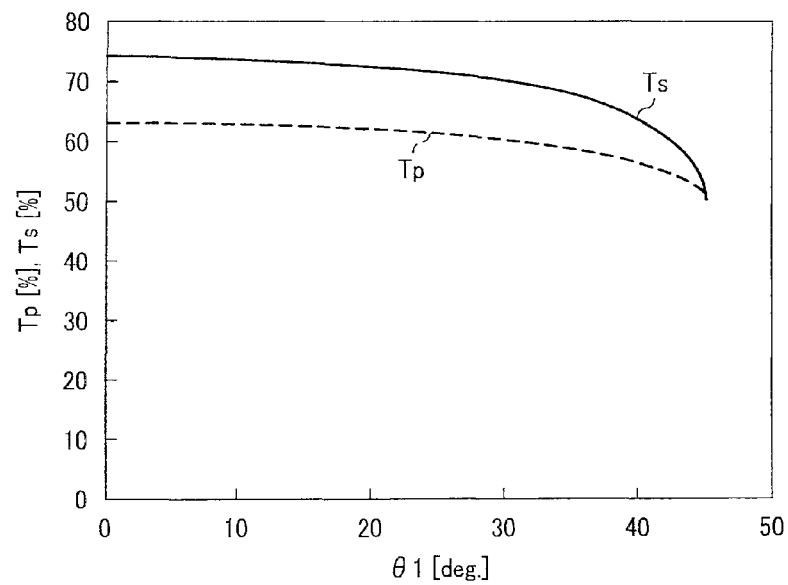
FIG. 11 is a diagram for describing relations between θ1, and Ts and Tp in the beam splitter $16_{10}$ according to a first embodiment of the present invention.
Figure 12:
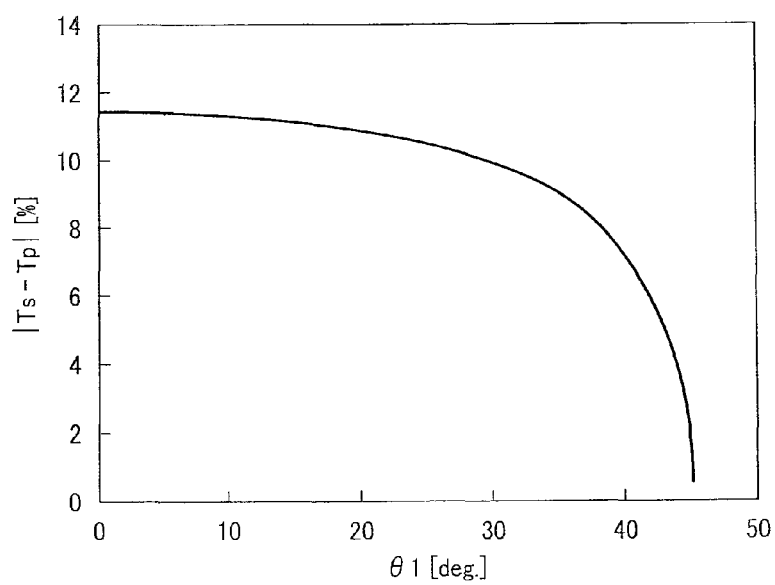
FIG. 12 is a diagram for describing relation between θ1 and |Ts−Tp| in the beam splitter $16_{10}$ according to the first embodiment.

Results of calculation on relations between $\theta 1$, and Ts and Tp in the beam splitter $16_{10}$ are shown in FIG. 11. As shown in FIG. 12, |Ts−Tp|, which is absolute value of the difference between Ts and Tp, decreases as $\theta 1$ approaches 45 degrees. Such transmittance characteristics of the beam-separating surface can be imparted to the beam splitter $16_{10}$ by adjusting thicknesses and refractive indices of layers in the dielectric multilayer film.

Figure 13:
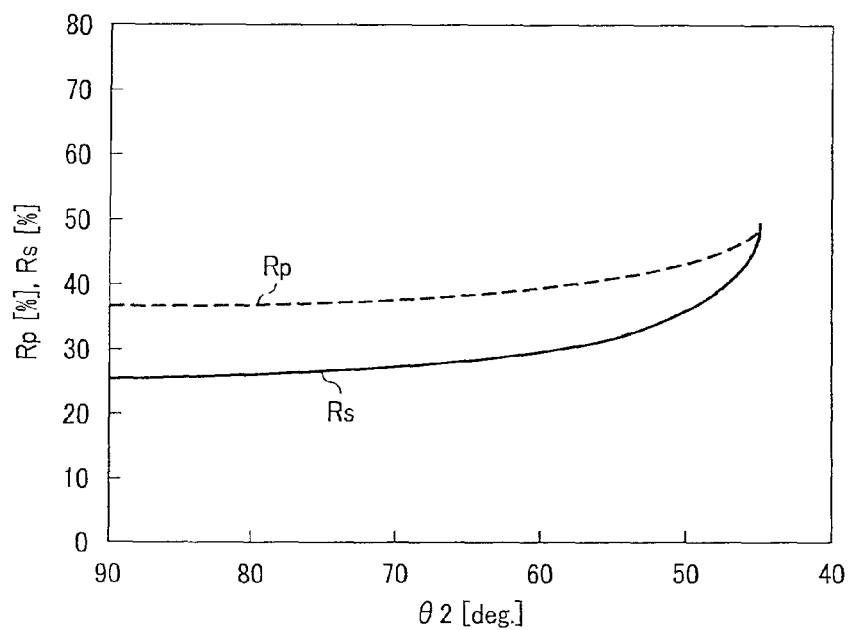
FIG. 13 is a diagram for describing relations between θ2, and Rs and Rp in the beam splitter $16_{10}$ according to the first embodiment.
Figure 14:
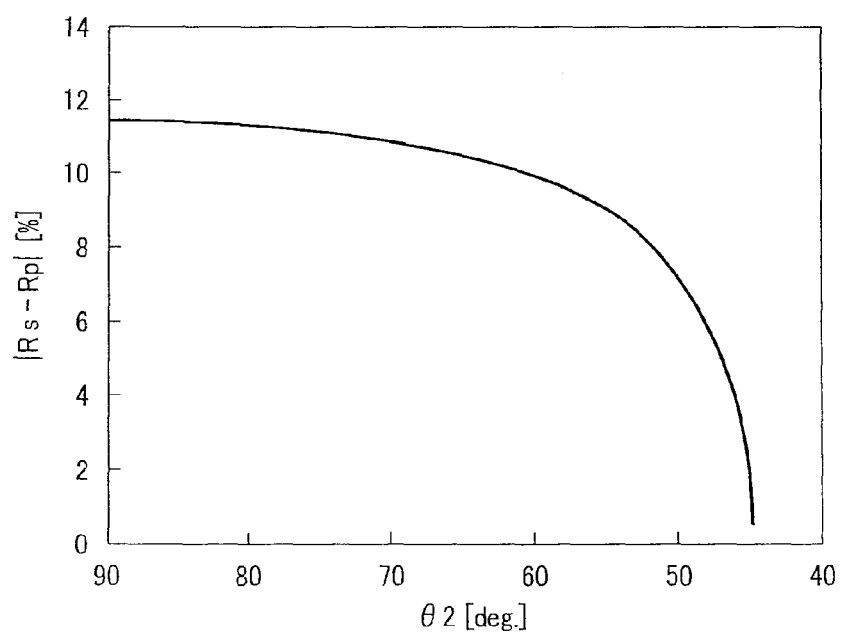
FIG. 14 is a diagram for describing relation between θ2 and |Rs−Rp| in the beam splitter $16_{10}$ according to the first embodiment.

Results of calculation on relations between $\theta 2$, and Rs and Rp in the beam splitter $16_{10}$ are shown in FIG. 13. As shown in FIG. 14, |Rs−Rp|, which is absolute value of the difference between Rs and Rp, decreases as $\theta 1$ approaches 45 degrees. Such reflectance characteristics of the beam-separating surface can be imparted to the beam splitter $16_{10}$ by adjusting thicknesses and refractive indices of layers in the dielectric multilayer film.

Figure 15:
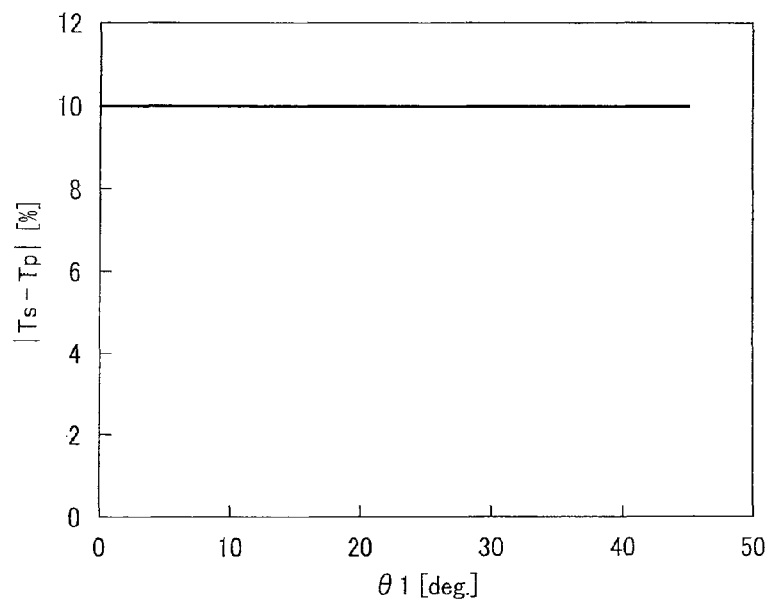
FIG. 15 is a diagram for describing relation between θ1 and |Ts−Tp| in a comparative example of the first embodiment.
Figure 16:
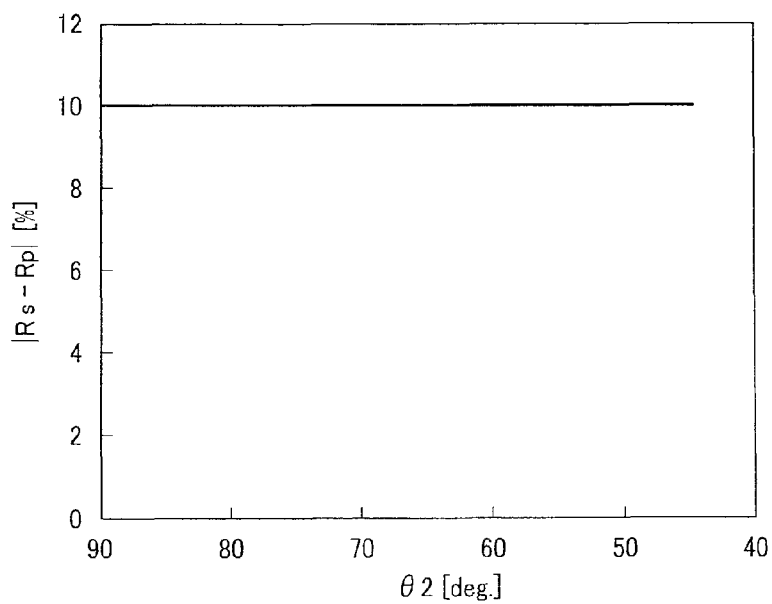
FIG. 16 is a diagram for describing relation between θ2 and |Rs−Rp| in the comparative example of the first embodiment.

A conventional beam splitter (hereinafter, "beam splitter A") is taken as a comparative example, with which |Ts−Tp| is constant relative to $\theta 1$ as shown in FIG. 15 and |Rs−Rp| is constant relative to $\theta 2$ as shown in FIG. 16.

Figure 17:
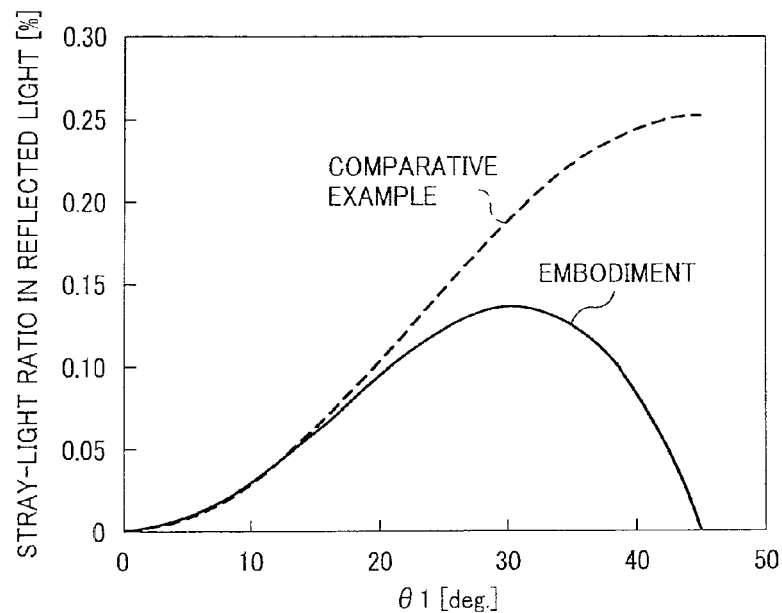
FIG. 17 is a diagram for describing a result of calculation on relation between θ1 and stray-light (ghosting-light) ratio in light reflected from the beam splitter $16_{10}$ according to the first embodiment and that in the comparative example.

Results of calculation on the relation between $\theta 1$ and ratio (%) in stray-light (or, ghosting-light) of light (hereinafter, "stray-light ratio") reflected from the beam splitter $16_{10}$ (which is embodiment) and on relation between $\theta 1$ and stray-light ratio in light reflected from the beam splitter A (which is comparative example) are shown in FIG. 17. This calculation is performed on an assumption that a polarizer, which shields the light beam A but allows the light beam B to transmit therethrough, is provided in an optical path of light beams reflected from the beam splitter, and the light beam B serves as signal light. With this configuration, part of the light beam A that has leaked from the polarizer becomes stray-light. It is assumed that optical phase difference between p-polarized light and s-polarized light is zero. Furthermore, optical absorption by the beam splitter and reflection from the back surface of the substrate are not taken into account.

Referring to FIG. 17, with the beam splitter A, the stray-light ratio monotonously increases as $\theta 1$ increases. In contrast, with the beam splitter $16_{10}$, the stray-light ratio begins to decrease from near a point where $\theta 1$ has become greater than 30 degrees; this indicates that production of stray-light is suppressed.

Figure 18:
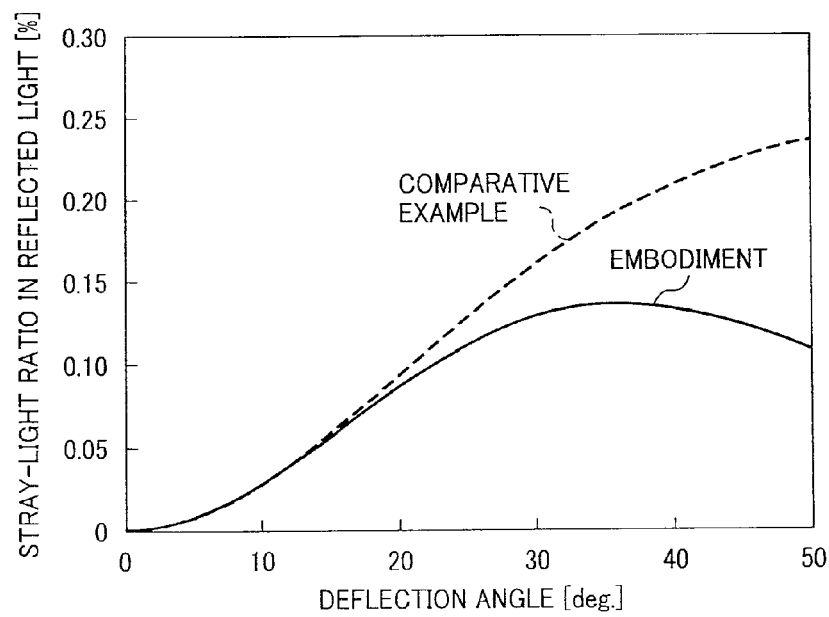
FIG. 18 is a diagram for describing a result of calculation on relation between deflection angle and stray-light ratio in light reflected from the beam splitter $16_{10}$ according to the first embodiment and that in the comparative example.

FIG. 18 illustrates the same results as shown in FIG. 17 with the deflection angle in place of $\theta 1$ as the horizontal axis. With an actual optical scanning apparatus, the range of the deflection angle is typically from approximately −40 to +40 degrees. Referring to FIG. 18, with the beam splitter $16_{10}$, stray-light in a large-deflection-angle range, where the deflection angle is relatively large, is considerably suppressed as compared with the beam splitter A.

Figure 19:
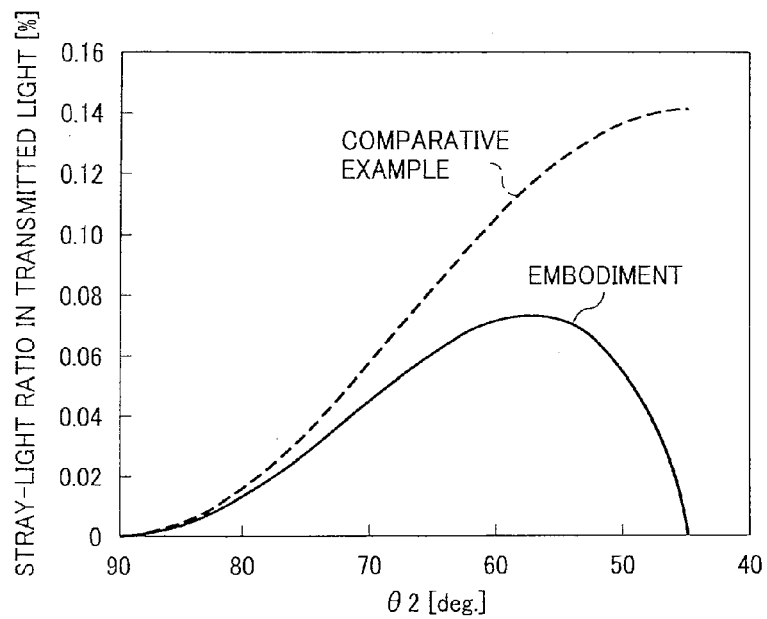
FIG. 19 is a diagram for describing a result of calculation on relation between θ2 and stray-light ratio in light transmitted through the beam splitter $16_{10}$ according to the first embodiment and that in the comparative example.

Results of calculation on relation between $\theta 2$ and stray-light ratio (%) in light transmitted through the beam splitter $16_{10}$ (embodiment) and relation between $\theta 2$ and stray-light in light transmitted through the beam splitter A (comparative example) are shown in FIG. 19. This calculation is performed on an assumption that a polarizer, which shields the light beam B but allows the light beam A to transmit therethrough, is provided in an optical path of light beams having transmitted through the beam splitter, and the light beam A serves as signal light. With this configuration, part of the light beam B that has leaked from the polarizer becomes stray-light. It is assumed that optical phase difference between p-polarized light and s-polarized light is zero. Furthermore, optical absorption by the beam splitter and reflection from the back surface of the substrate are not taken into account.

Referring to FIG. 19, with the beam splitter A, the stray-light ratio monotonously increases as $\theta 2$ increases. In contrast, with the beam splitter $16_{10}$, the stray-light ratio begins to decrease from near a point where $\theta 2$ has become greater than 30 degrees; this indicates that production of stray-light is suppressed.

Figure 20:
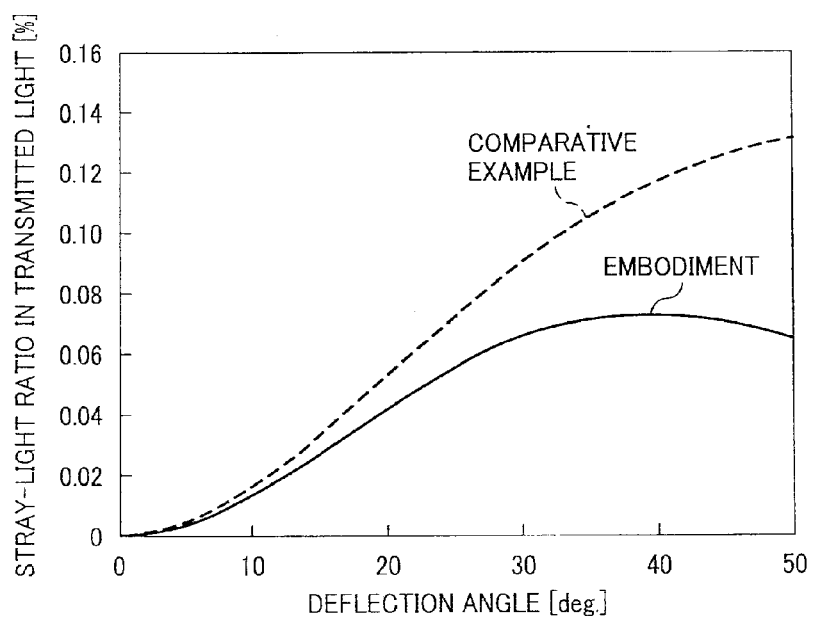
FIG. 20 is a diagram for describing a result of calculation on relation between deflection angle and stray-light ratio in light transmitted through the beam splitter $16_{10}$ according to the first embodiment and that in the comparative example.

FIG. 20 illustrates the same results shown in FIG. 19 with deflection angle, in place of $\theta 2$, as the horizontal axis. Referring to FIG. 20, with the beam splitter $16_{10}$, stray-light in a large-deflection-angle range, where the deflection angle is relatively large, is considerably suppressed as compared with the beam splitter A.

The reason why, in the comparative example, the stray-light ratio varies with respect to $\theta 1$ and $\theta 2$ in spite of that each of |Ts−Tp| and |Rs−Rp| remains constant with varying $\theta 1$ and $\theta 2$ is that the ratio of light intensity (hereinafter, "light intensity ratio") between p-polarized component and s-polarized light incident on the beam-separating surface varies with $\theta 1$ and $\theta 2$. For instance, when the light beam A impinges on the beam-separating surface in a state where $\theta 1$ is infinitely close to 0 degrees and $\theta 2$ is infinitely close to 90 degrees, transmitted light contains substantially only p-polarized component but contains little s-polarized component. Accordingly, angle of polarization rotation is considerably small irrespective of the value of |Ts−Tp| or |Rs−Rp|. In contrast, when the light beam A impinges on the beam-separating surface in a state where each of $\theta 1$ and $\theta 2$ is close to 45 degrees, light intensity ratio between p-polarized component and s-polarized component of outgoing light is close to 1:1, where the angle of polarization rotation is susceptible to the difference between Ts and Tp or the difference between Rs and Rp. Accordingly, stray-light is likely to be produced.

In the calculations described above, it is assumed that the optical phase difference between s-polarized component and p-polarized component in a light beam that exits the beam splitter is zero. However, described below is calculation performed on an assumption that s-polarized component and p-polarized component in an outgoing light beam from the beam splitter have optical phase difference therebetween.

(A) Case where s-polarized component and p-polarized component contained in a light beam reflected from the beam splitter has optical phase difference δ(rs, rp) therebetween In this case, when linearly-polarized light beam impinges on the beam splitter to be reflected therefrom, resultant reflected light beam is elliptically-polarized light. For extreme example, when the optical phase difference is a quarter-wave of the wavelength and light intensity of the s-polarized component is equal to light intensity of the p-polarized component, resultant reflected light is circularly-polarized light.

It is necessary to shield the light beam A contained in the light reflected from the beam splitter; however, if the reflected light is elliptically-polarized light, because elliptically-polarized light contains component that cannot be shielded, such a not-shielded component becomes stray-light (ghosting-light). Accordingly, the need arises for additionally taking the optical phase difference into account.

It is assumed here that the beam-separating surface is tilted 45 degrees relative to the deflection plane.

Figure 21:
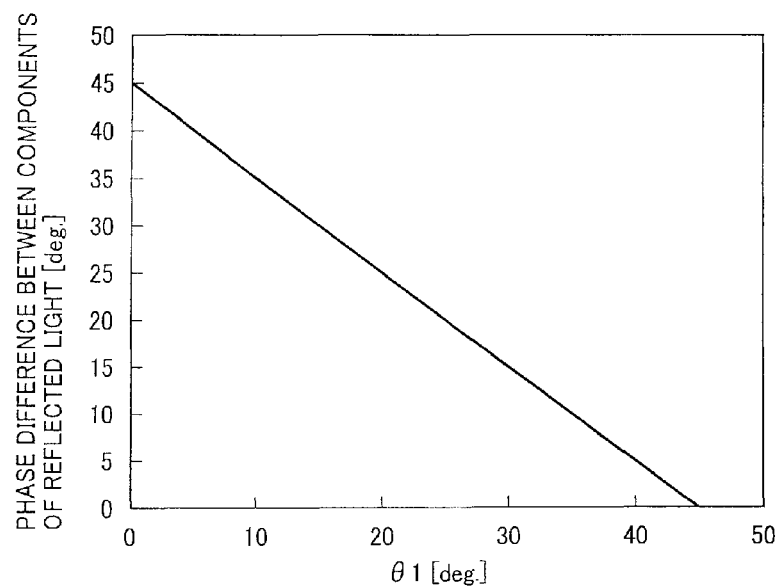
FIG. 21 is a diagram for describing a result of calculation on relation between θ1 and absolute value of phase difference between components of light reflected from the beam splitter $16_{10}$ according to the first embodiment.

A result of calculation on relation between θ1 and |δ(rs, rp)| in the beam splitter $16_{10}$ is shown in FIG. 21. Referring to FIG. 21, |δ(rs, rp)| decreases as θ1 approaches 45 degrees. Such optical-phase-difference characteristics can be imparted to the beam splitter $16_{10}$ by adjusting thicknesses and refractive indices of layers in the dielectric multilayer film.

Figure 22:
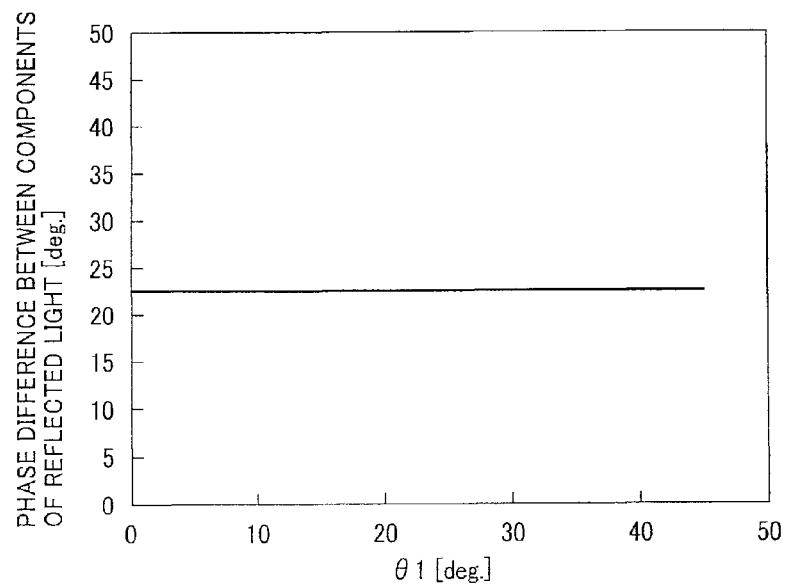
FIG. 22 is a diagram for describing a result of calculation on relation between θ1 and absolute value of phase difference between components of reflected light in a comparative example of the first embodiment.

A conventional beam splitter (hereinafter, "beam splitter B"), with which |δ(rs, rp)| is constant relative to θ1 as shown in FIG. 22, is taken as a comparative example.

Figure 23:
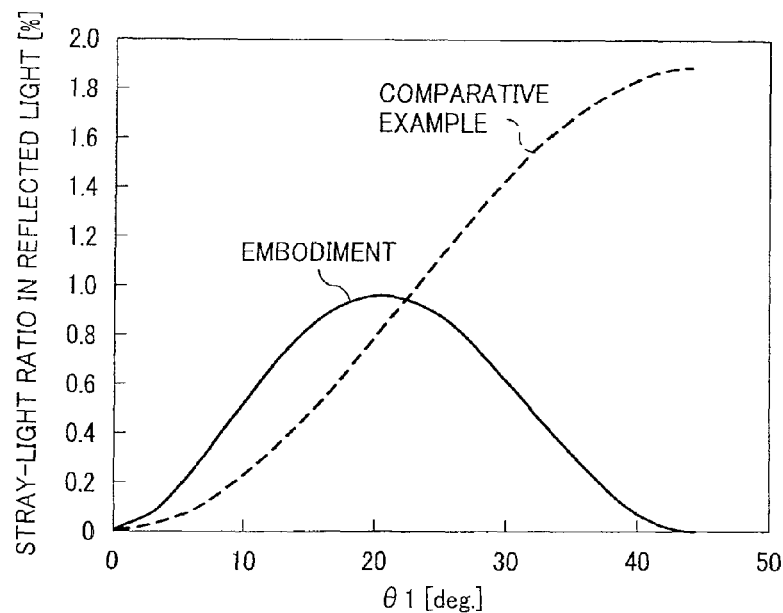
FIG. 23 is a diagram for describing a result of calculation on relation between θ1 and stray-light ratio in light reflected from the beam splitter $16_{10}$ according to the first embodiment and that in the comparative example.

Shown are in FIG. 23 results of calculation on relation between θ1 and stray-light ratio (%) in light reflected from the beam splitter $16_{10}$ (embodiment) and on relation between θ1 and stray-light ratio in light reflected from the beam splitter B (comparative example). This calculation is performed on an assumption that a polarizer, which shields the light beam A but allows the light beam B to transmit therethrough, is arranged in an optical path of light beams reflected from the beam splitter, and the light beam B serves as signal light. With this configuration, part of the light beam A that has leaked from the polarizer becomes stray-light. It is assumed that each of Ts, Tp, Rs, and Rp is 50%. Furthermore, optical absorption by the beam splitter and reflection from the back surface of the substrate are not taken into account.

Referring to FIG. 23, with the beam splitter B, the stray-light ratio monotonously increases as θ1 increases. In contrast, with the beam splitter $16_{10}$, the stray-light ratio begins to decrease from near a point where θ1 has become greater than 20 degrees; this indicates that production of stray-light is suppressed as compared with the beam splitter B in a range where θ1 is equal to or greater than approximately 22 degrees.

Figure 24:
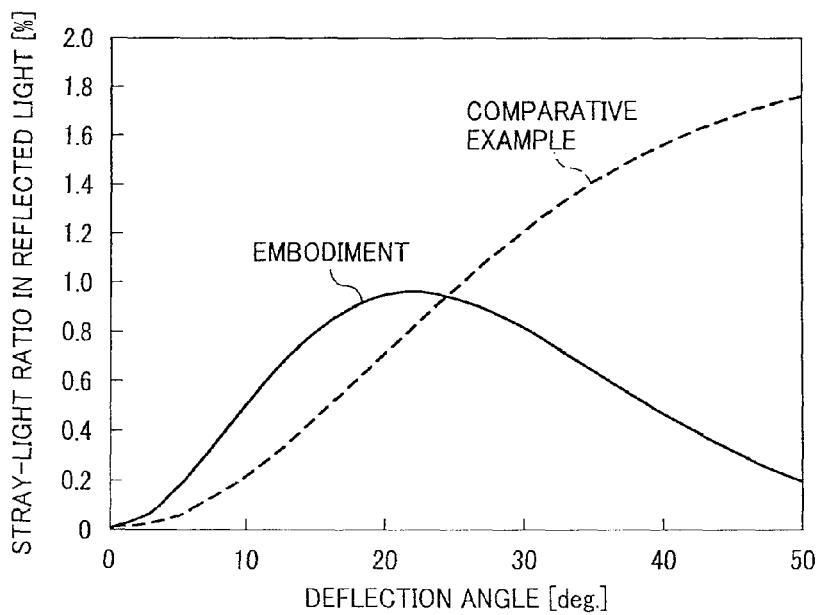
FIG. 24 is a diagram for describing a result of calculation on relation between deflection angle and stray-light ratio in light reflected from the beam splitter $16_{10}$ according to the first embodiment and that in the comparative example.

FIG. 24 illustrates the same results shown in FIG. 23 with the deflection angle in place of θ1 as the horizontal axis. Referring to FIG. 24, with the beam splitter $16_{10}$, production of stray-light in a large-deflection-angle range, where the deflection angle is relatively large, is considerably suppressed as compared with the beam splitter B.

(B) Case where s-polarized component and p-polarized component contained in a light beam transmitted through the beam splitter have optical phase difference δ(ts, tp) therebetween In this case, when linearly-polarized light beam impinges on the beam splitter to transmit therethrough, resultant transmitted light beam becomes elliptically-polarized light.

It is necessary to shield the light beam B contained in the light having transmitted through the beam splitter; however, if the transmitted light is elliptically-polarized light, because elliptically-polarized light contains component that cannot be shielded, such a not-shielded component becomes stray-light. Accordingly, the need arises for additionally taking the control of the optical phase difference into account.

It is similarly assumed that the beam-separating surface is tilted 45 degrees with respect to the deflection plane.

Figure 25:
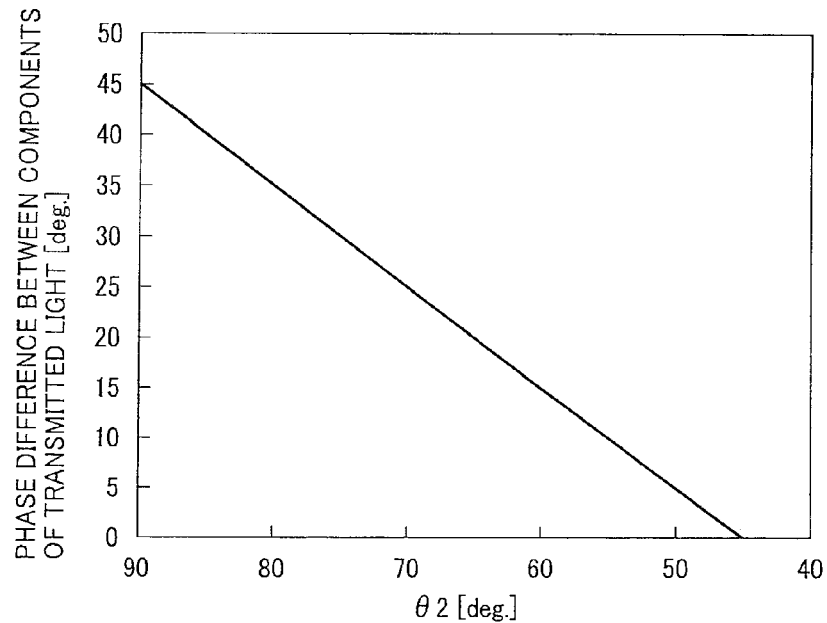
FIG. 25 is a diagram for describing a result of calculation on relation between θ2 and absolute value of phase difference between components of light transmitted through the beam splitter $16_{10}$ according to the first embodiment.

Shown is in FIG. 25 a result of calculation on relation between θ2 and |δ(ts, tp)| in the beam splitter $16_{10}$. Referring to FIG. 25, |δ(ts, tp)| decreases as θ2 approaches 45 degrees. Such optical-phase-difference characteristics can be imparted to the beam splitter $16_{10}$ by adjusting thicknesses and refractive indices of layers in the dielectric multilayer film.

Figure 26:
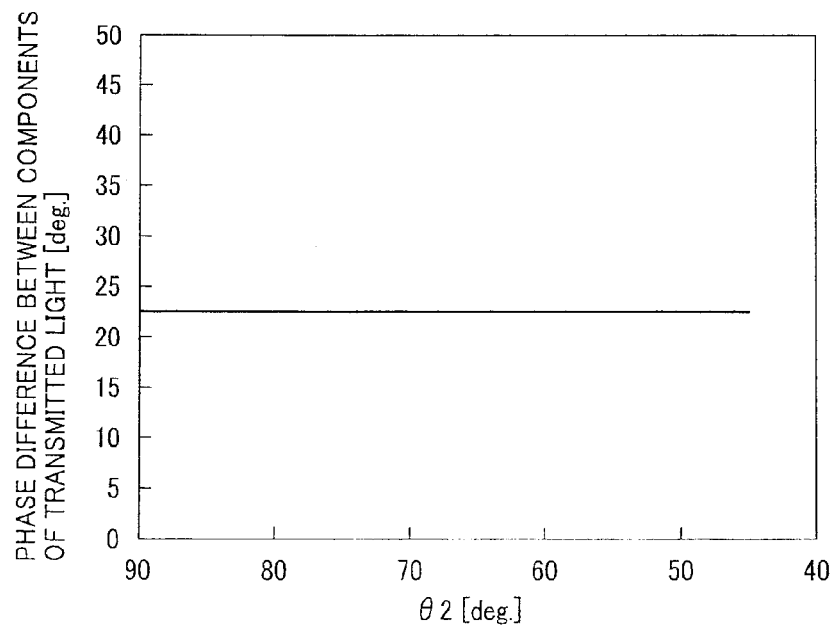
FIG. 26 is a diagram for describing a result of calculation on relation between θ2 and absolute value of phase difference between components of transmitted light in a comparative example of the first embodiment.

A conventional beam splitter (hereinafter, "beam splitter C"), with which |δ(ts, tp)| is constant relative to θ2 as shown in FIG. 26, is taken into as a comparative example.

Figure 27:
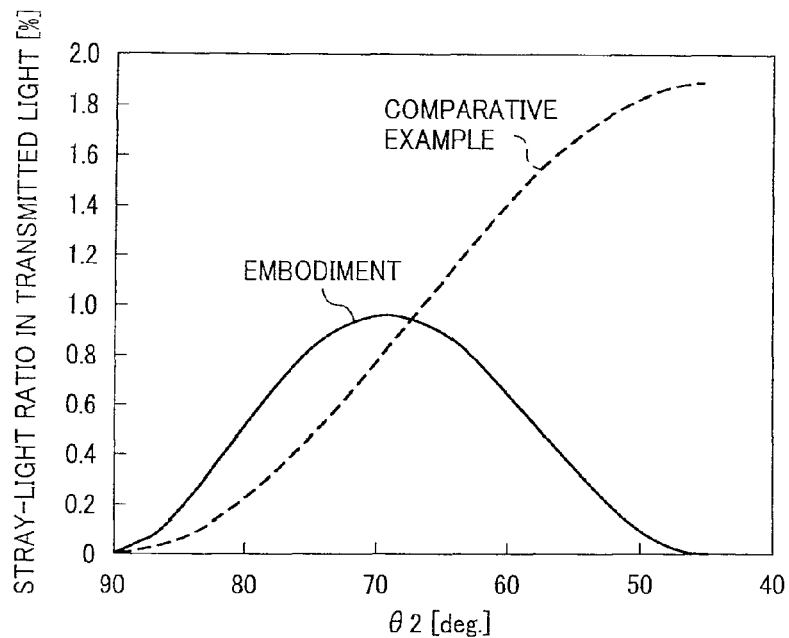
FIG. 27 is a diagram for describing a result of calculation on relation between θ2 and stray-light ratio in light transmitted through the beam splitter $16_{10}$ according to the first embodiment and that in the comparative example.

Shown are in FIG. 27 results of calculation on relation between θ2 and stray-light ratio (%) in light transmitted through the beam splitter $16_{10}$ (embodiment) and on relation between θ2 and stray-light ratio in light transmitted through the beam splitter C (comparative example). This calculation is performed on an assumption that a polarizer, which shields the light beam B but allows the light beam A to transmit therethrough, is arranged in an optical path of light beams having transmitted through the beam splitter, and the light beam A serves as signal light. With this configuration, part of the light beam B that has leaked from the polarizer becomes stray-light. It is assumed that each of Ts, Tp, Rs, and Rp is 50%. Furthermore, optical absorption by the beam splitter and reflection from the back surface of the substrate are not taken into account.

Referring to FIG. 27, with the beam splitter C, the stray-light ratio monotonously increases as θ2 increases. In contrast, with the beam splitter $16_{10}$, the stray-light ratio begins to decrease from near a point where θ2 has become greater than 20 degrees; this indicates that production of stray-light is suppressed as compared with the beam splitter C in a range where θ2 is equal to or greater than approximately 22 degrees.

Figure 28:
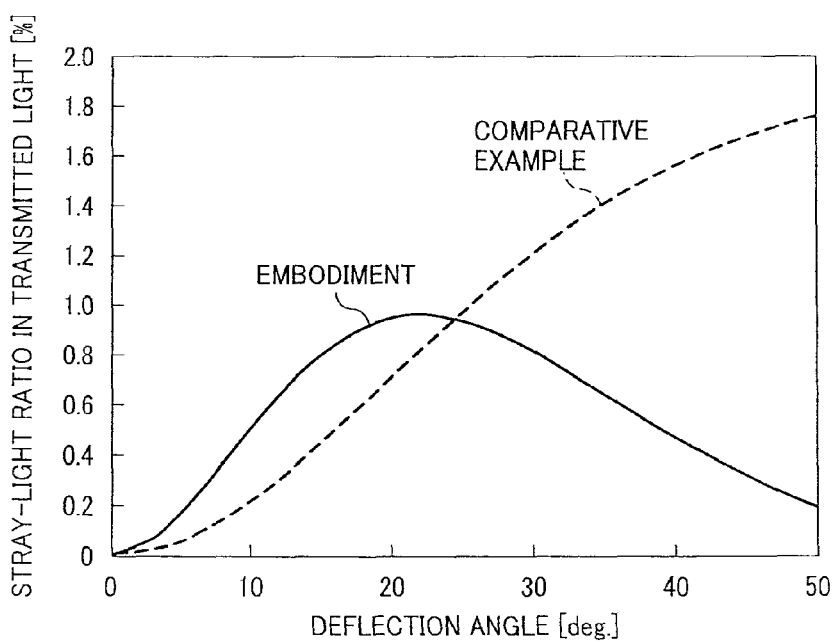
FIG. 28 is a diagram for describing a result of calculation on relation between deflection angle and stray-light ratio in light transmitted through the beam splitter $16_{10}$ according to the first embodiment and that in the comparative example.

FIG. 28 illustrates the same results shown in FIG. 27 with the deflection angle in place of θ2 as the horizontal axis. Referring to FIG. 28, with the beam splitter $16_{10}$, production of stray-light in a large-deflection-angle range, where the deflection angle is relatively large, is considerably suppressed as compared with the beam splitter C.

From a practical point of view, as a criterion for the stray-light ratio, the stray-light ratio is preferably equal to or below 1% in consideration of exposure of photosensitive member. As is apparent from FIG. 24 and FIG. 28, with the beam splitter $16_{10}$, this criterion is satisfied throughout a range (from −40 to +40 degrees) within which approximately any possible deflection angle in the optical scanning apparatus falls.

The reason why, in the comparative example, the stray-light ratio varies with respect to θ1 and θ2 in spite of that each of δ(rs, rp) and δ(ts, tp) remains constant with varying θ1 and θ2, is that the light intensity ratio between p-polarized component and s-polarized light incident on the beam-separating surface varies with θ1 and θ2. For instance, when the light beam A impinges on the beam-separating surface in a state where θ1 is infinitely close to 0 degrees and θ2 is infinitely close to 90 degrees, transmitted light contains substantially only p-polarized component but contains little s-polarized component. Accordingly, ellipticity is considerably small irrespective of the value of δ(rs, rp) or δ(ts, tp). In contrast, when the light beam A impinges on the beam-separating surface in a state where each of θ1 and θ2 is close to 45 degrees, light intensity ratio between p-polarized component and s-polarized component of outgoing light is close to 1:1, where ellipticity of polarization is highly susceptible to δ(rs, rp) or δ(ts, tp). Accordingly, stray-light is likely to be produced.

Analysis described above hitherto on results of simulation performed on an assumption reveals that |Ts−Tp|, |Rs−Rp|, |δ(ts, tp)|, and |δ(rs, rp)| are at their minimum values when each of θ1 and θ2 is 45 degrees. However, these minimum values are desirably changed depending on an effective range of incident angle. Also upon this assumption, desirably adopted is a configuration designed to reduce |Ts−Tp|, |Rs−Rp|, |δ(ts, tp)|, and |δ(rs, rp| to minimum when each of θ1 and θ2 is closest to 45 degrees.

For instance, as described above, with an actual optical scanning apparatus, the range of the deflection angle is typically from −40 to +40 degrees, which corresponds to the incident angle of from 45 to 57.2 degrees. In this case, when the incident angle is 45 degrees, θ1 is 0 degrees; when the incident angle is 57.2 degrees, θ1 is 32.7 degrees. On the other hand, when the incident angle is 45 degrees, θ2 is 90 degrees; when the incident angle is 57.2 degrees, θ2 is 57.3 degrees. Hence, a configuration is most preferably adopted designing to reduce |Ts−Tp|, |Rs−Rp|, |δ(ts, tp)|, and |δ(rs, rp)| to minimum in a situation where θ1=32.7° and θ2=57.3°.

Desirably adopted is a configuration that is designed to reduce |Ts−Tp|, |Rs−Rp|, |δ(ts, tp)|, and |δ(rs, rp)| as θ1 varies from 0 to 32.7 degrees and θ2 varies from 90 to 57.3 degrees for effective suppression of stray-light. In practical use, it is not necessarily configured to monotonously reduce |Ts−Tp|, |Rs−Rp|, |δ(ts, tp)|, and |δ(rs, rp)|; but a configuration designed to generally reduce these values can be satisfactorily adopted.

Figure 29:
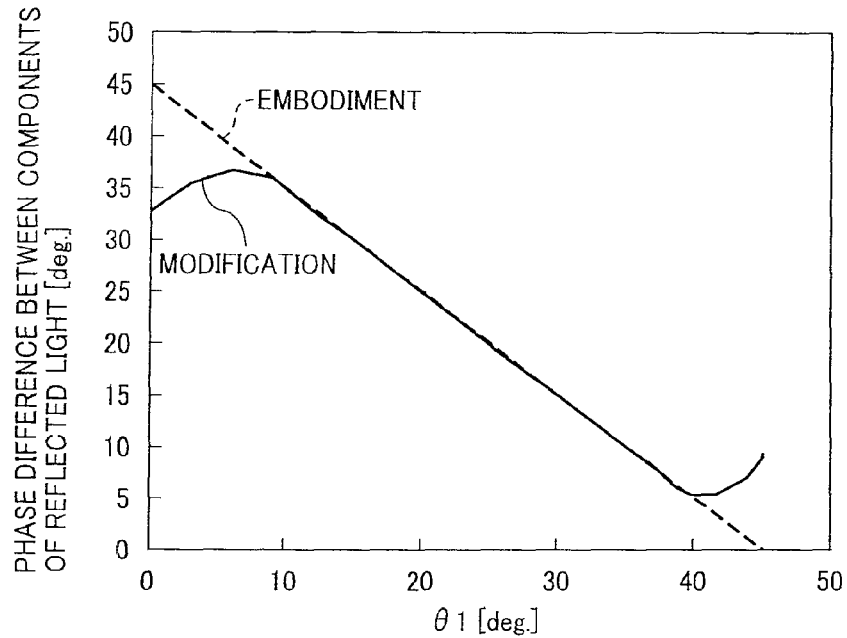
FIG. 29 is a diagram for describing a modification of relation between θ1 and absolute value of phase difference between components of light reflected from the beam splitter $16_{10}$ according to the first embodiment.

A modification of relation between θ1 and |δ(rs, rp)| is shown in FIG. 29. Unlike the dotted line, which is the same line as that shown in FIG. 21 described above, the phase difference in the modification does not monotonously decrease with θ1. Such optical-phase-difference characteristics can be obtained by adjusting thicknesses and refractive indices of layers in the dielectric multilayer film.

Shown is in FIG. 30A a result of calculation on relation between θ1 and stray-light ratio (%) in light reflected from a beam splitter, which corresponds to the modification shown in FIG. 29. This calculation is performed on an assumption that a polarizer, which shields the light beam A but allows the light beam B to transmit therethrough, is arranged in an optical path of light beams reflected from the beam splitter, and the light beam B serves as signal light. With this configuration, part of the light beam A that has leaked from the polarizer becomes stray-light. It is assumed that each of Ts, Tp, Rs, and Rp is 50%. Furthermore, not taken into account are optical absorption by the beam splitter and reflection from the back surface of the substrate. The result of calculation in the embodiment shown in FIG. 23 is indicated by a dotted line.

Figure 30:
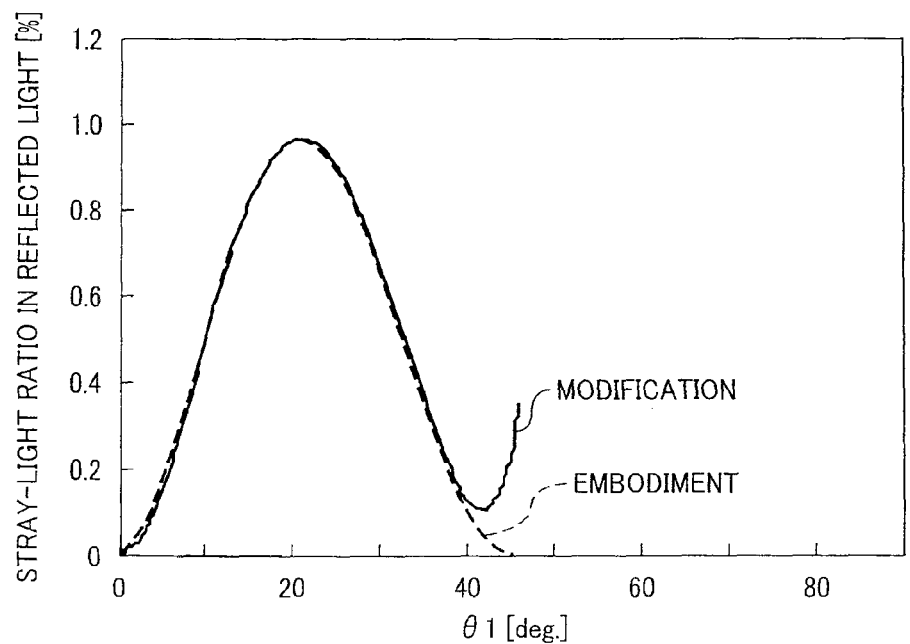
FIG. 30 is a diagram for describing a result of calculation on relation between θ1 and stray-light ratio in light reflected from the modification of the beam splitter $16_{10}$ according to the first embodiment.

Referring to FIG. 30, the stray-light ratio in the modification is substantially same as that in the first embodiment in a range where θ1 is from 0 to 10 degrees. Although the stray-light ratio in the modification differs from that in the first embodiment in a range where θ1 is from 40 to 45 degrees, the amount of stray-light in this range is negligibly small because phase difference is sufficiently small.

Figures 31, 32:
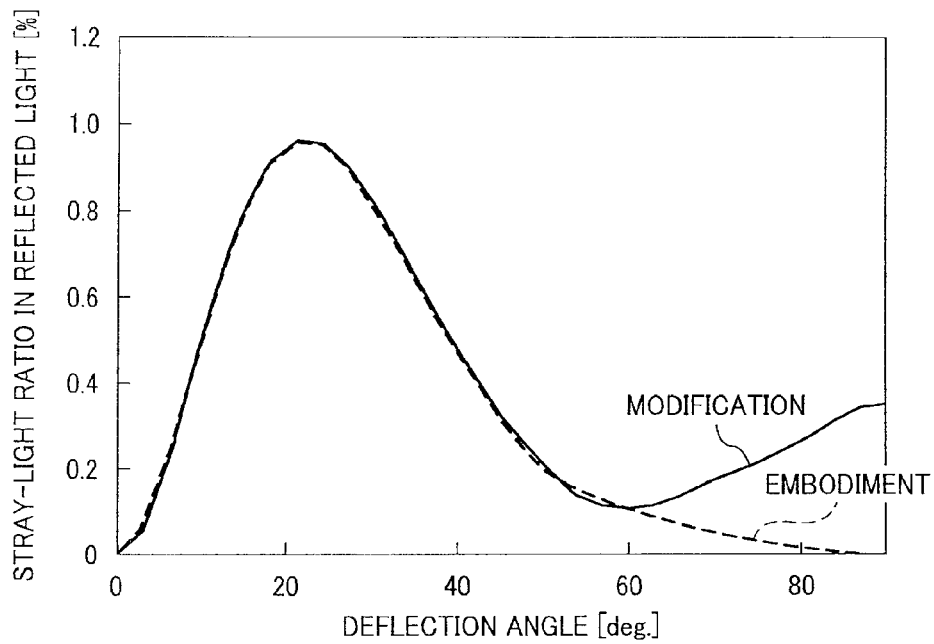
FIG. 31 is a diagram for describing a result of calculation on relation between deflection angle and stray-light ratio in light reflected from the modification of the beam splitter $16_{10}$ according to the first embodiment.
FIG. 32 is a diagram for describing relations among deflection angle, incident angle, θ1, and θ2 of the beam splitter $16_{10}$ according to the first embodiment whose beam-separating surface tilted 60 degrees relative to deflection plane.

FIG. 31 illustrates the same results given in FIG. 30 with the deflection angle in place of θ1 as the horizontal axis. In a range where θ1 is particularly close to 0 degrees, or in a range where |Ts−Tp|, |Rs−Rp|, |δ(ts, tp)|, and |δ(rs, rp)| are sufficiently small as shown in FIG. 31, there can be some cases in practical use where monotonously reducing the phase difference is not necessarily required; but a configuration designed to generally reduce the phase difference can be satisfactorily adopted. Minimum requirement for such cases is that within an effective range of incident angle, at least any one of a value of |Ts−Tp| and a value of |Rs−Rp|, in a situation where each of the angle θ1 and the angle θ2 is equal to or closest to 45 degrees, is smaller than a corresponding one of a value of |Ts−Tp| and a value of |Rs−Rp| in a situation where a corresponding one of the angle θ1 and the angle θ2 is farthest from 45 degrees.

Analyzed hitherto are the arrangement where the beam splitter $16_{10}$ is situated such that the beam-separating surface is tilted 45 degrees relative to the deflection plane. However, in actual arrangement, there can be cases where the beam-separating surface is tilted other than 45 degrees because of layout requirement. For instance, when the beam-separating surface is tilted 60 degrees relative to the deflection plane and the range of deflection angle is set to from −40 to +40 degrees as in the case described above, the range of the incident angle is from 30 to 48.4 degrees. Specifically, when the incident angle is 30 degrees, θ1 is 0 degrees; when the incident angle is +48.4 degrees, θ1 is 48.1 degrees. When the incident angle is 30 degrees, θ2 is 90 degrees; when the incident angle is 48.4 degrees, θ2 is 41.9 degrees (see FIG. 32).

Figure 33:
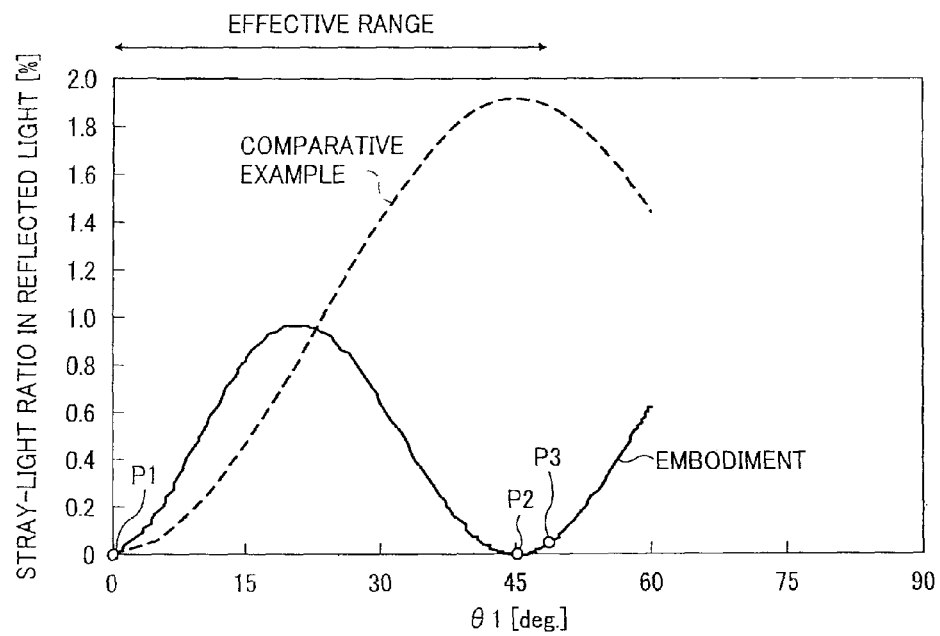
FIG. 33 is a diagram for describing a result of calculation on relation between θ1 and stray-light ratio in light reflected from the beam splitter $16_{10}$ according to the first embodiment whose beam-separating surface tilted 60 degrees relative to the deflection plane.

Hence, preferably adopted is a configuration that is designed to reduce |Ts−Tp|, |Rs−Rp|, |δ(ts, tp)|, and |δ(rs, rp)| to minimum in a state where θ1=θ2=45°. The stray-light ratio at θ1=45° is plotted as point P2 on the solid line shown in FIG. 33. In FIG. 33, point P1 corresponds to a stray-light ratio at θ1=0°; point P3 corresponds to a stray-light ratio at θ1=48.1°. Referring to FIG. 33, the amount of stray-light is at the smallest at P2, except for P1. In FIG. 33, a result in the comparative example based on the phase difference of FIG. 22 is also shown by a dotted line.

Figure 34:
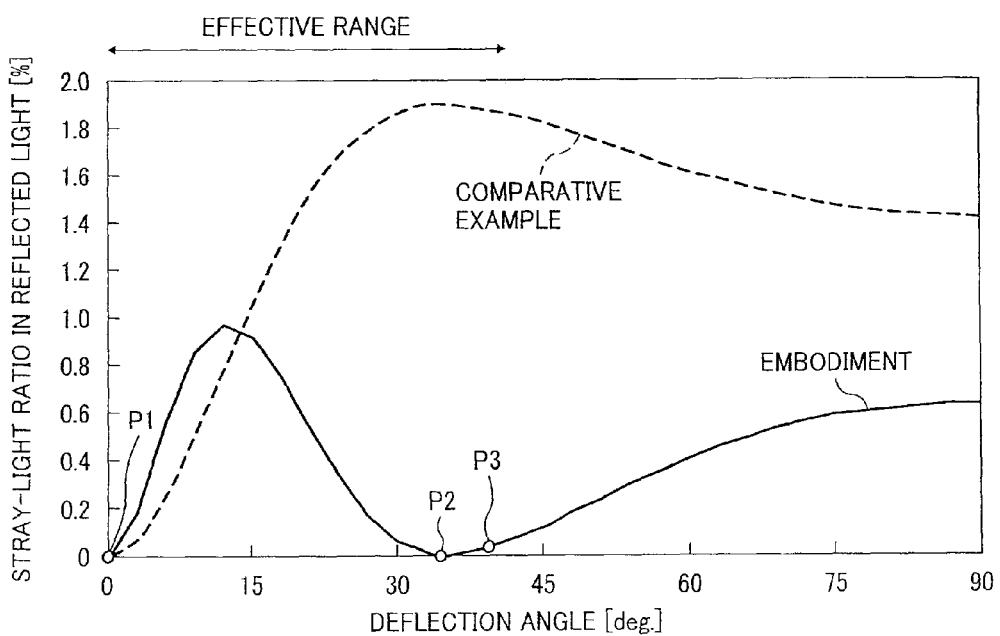
FIG. 34 is a diagram for describing a result of calculation on relation between deflection angle and stray-light ratio in light reflected from the beam splitter $16_{10}$ according to the first embodiment whose beam-separating surface tilted 60 degrees relative to the deflection plane.

FIG. 34 illustrates the same results given in FIG. 33 with the deflection angle in place of θ1 as the horizontal axis.

An arrangement where the beam-separating surface is tilted 30 degrees relative to the deflection plane will be described below. In this case, when the range of deflection angle is set to from −40 to +40 degrees, the range of the incident angle is from 60 to 67.5 degrees. Specifically, when the incident angle is 60 degrees, θ1 is 0 degrees; when the incident angle is +67.5 degrees, θ1 is 20.4 degrees. When the incident angle is 60 degrees, θ2 is 90 degrees; when the incident angle is 67.5 degrees, θ2 is 69.6 degrees (see FIG. 35).

Figures 35, 36:
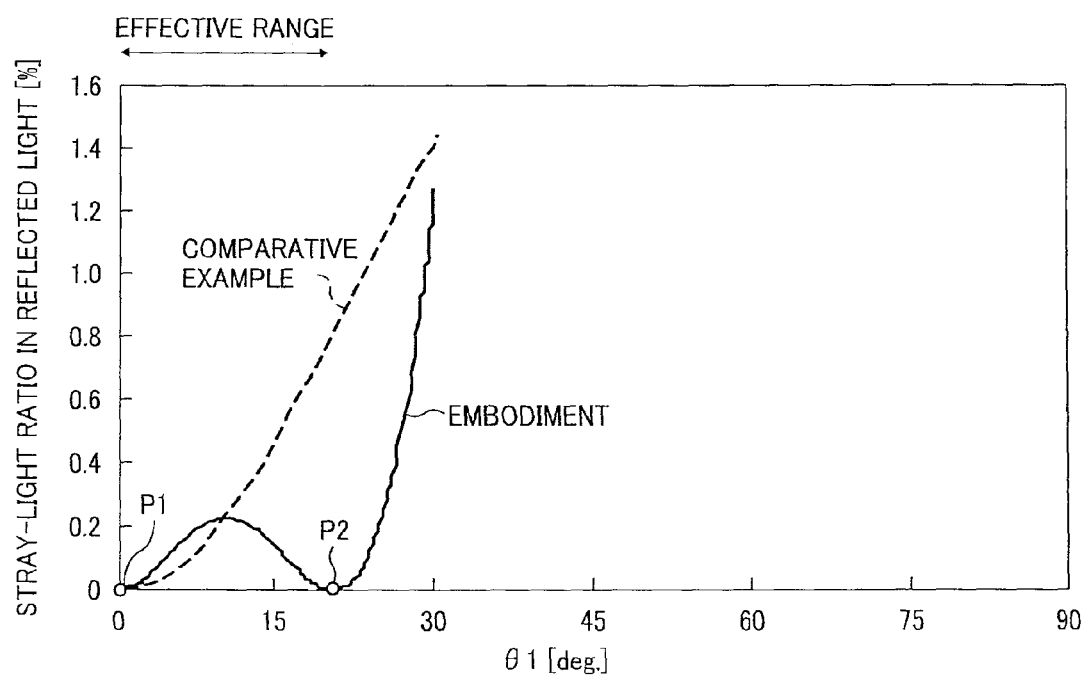
FIG. 35 is a diagram for describing relation among deflection angle, incident angle, θ1, and θ2 of the beam splitter $16_{10}$ according to the first embodiment whose beam-separating surface tilted 30 degrees relative to the deflection plane.
FIG. 36 is a diagram for describing a result of calculation on relation between θ1 and stray-light ratio in light reflected from the beam splitter $16_{10}$ according to the first embodiment whose beam-separating surface tilted 30 degrees relative to the deflection plane.

Hence, preferably adopted is a configuration designed to reduce |Ts−Tp|, |Rs−Rp|, |δ(ts, tp)|, and |δ(rs, rp)| to minimum in a state where θ1=20.4° and θ2=69.6°. The stray-light ratio at θ1=20.4° is plotted as point P2 on the solid line shown in FIG. 36. In FIG. 36, point P1 corresponds to a stray-light ratio at θ1=0°. Referring to FIG. 36, the amount of stray-light is at the smallest at P2, except for P1. In FIG. 36, a result in the comparative example based on the phase difference of FIG. 22 is also presented by a dotted line.

Figure 37:
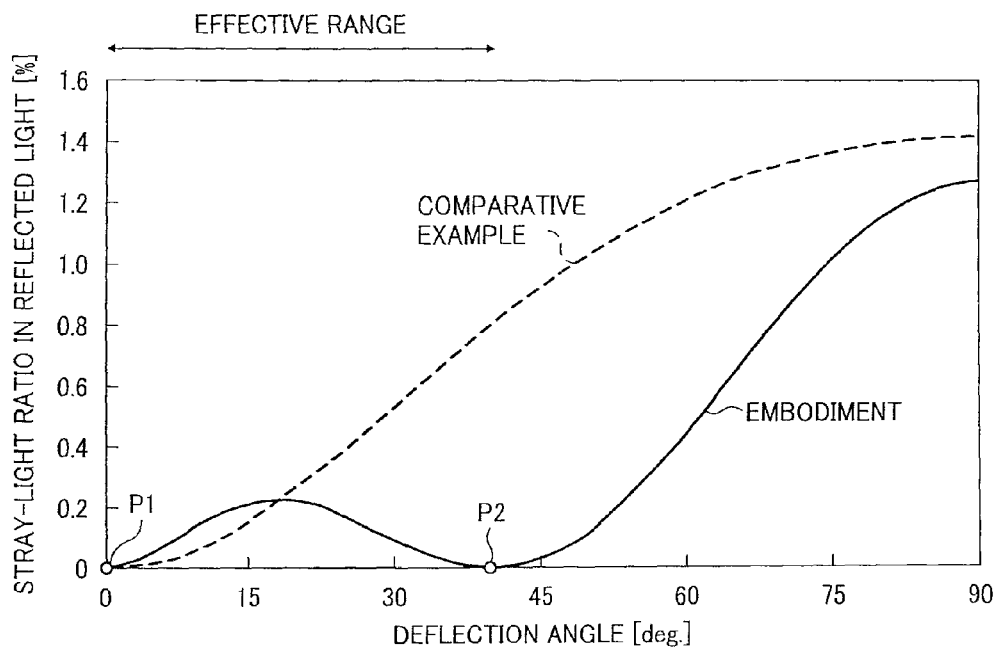
FIG. 37 is a diagram for describing a result of calculation on relation between deflection angle and stray-light ratio in light reflected from the beam splitter $16_{10}$ according to the first embodiment whose beam-separating surface tilted 30 degrees relative to the deflection plane.

FIG. 37 illustrates the same results given in FIG. 36 with the deflection angle in place of θ1 as the horizontal axis.

Referring back to FIG. 8, the polarizer $16_{11}$ is arranged on the negative side of the beam splitter $16_{10}$ in the X direction as well as arranged in an optical path of light beams having transmitted through the beam splitter $16_{10}$. The polarizer $16_{12}$ is arranged on the negative side of the beam splitter $16_{10}$ in the Z direction as well as arranged in an optical path of light beams reflected from the beam splitter $16_{10}$.

Figure 38:
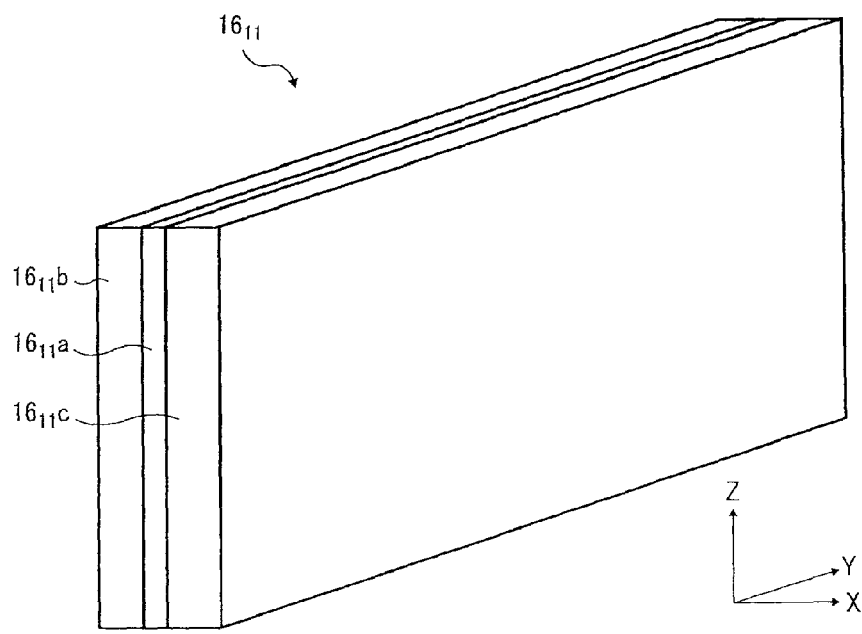
FIG. 38 is a diagram for describing the configuration of a polarizer.

A general polarizing film, obtained by impregnating a film with iodine or dichroic dye and then monoaxially stretching the film, can be used as each polarizer. In this example, as shown in FIG. 38, the polarizer $16_{11}$ is formed by, for instance, sandwiching a polarizing film $16_{11}a$ between two transparent substrates ($16_{11}b$ and $16_{11}c$), such as glass plates. This structure allows substantial improvement of wavefront aberration characteristics. When a higher extinction ratio is required, each polarizer can be made as a wire-grid polarizer or a metal-type dispersion polarizing film. The structure of the polarizer $16_{12}$ is similar to that of the polarizer $16_{11}$.

Figure 39:
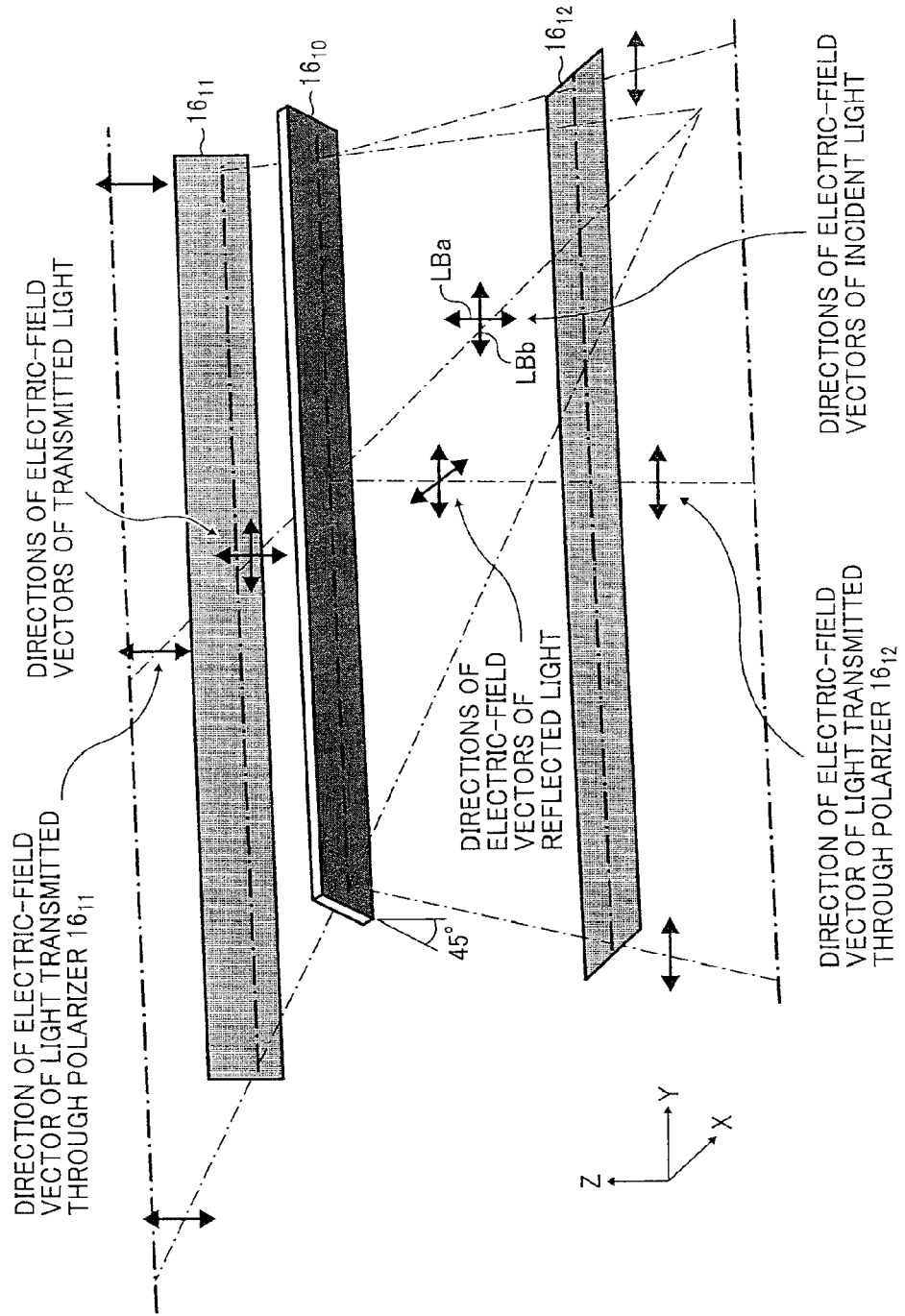
FIG. 39 is a diagram for describing how the polarizer works.

The polarizer $16_{11}$ is arranged such that a transmission axis of the polarizer $16_{11}$ is parallel to the Z-axis. As shown in FIG. 39, for instance, majority of the light beams LBa, having transmitted through the beam splitter $16_{10}$, transmits through the polarizer $16_{11}$. In contrast, majority of the light beams LBb having transmitted through the beam splitter $16_{10}$ is shielded by the polarizer $16_{11}$. Thus, the polarizer $16_{11}$ selectively allows only the light beams LBa from among the light beams having transmitted through the beam splitter $16_{10}$ to transmit through the polarizer $16_{11}$.

The polarizer $16_{12}$ is arranged such that a transmission axis of the polarizer $16_{12}$ is parallel to the Y-axis. As shown in FIG. 39, for instance, majority of the light beams LBb reflected from the beam splitter $16_{10}$ transmits through the polarizer $16_{12}$. In contrast, majority of the light beams LBa reflected from the beam splitter $16_{10}$ is shielded by the polarizer $16_{12}$. Thus, the polarizer $16_{12}$ selectively allows only the light beams LBb from among the light beams reflected from the beam splitter $16_{10}$ to transmit through the polarizer $16_{12}$.

Meanwhile, a large amount of reflected light being generated by reflection from the polarizers, the polarization-separation device $16_1$ is desirably configured to prevent the reflected light which is produced by reflection from the polarizers from becoming noise light. Unlike the stray-light (ghosting-light) that is light traveling toward different photosensitive drums than a target photosensitive drum, the noise light includes not only the stray-light but also light that travels other directions than the directions toward the different photosensitive drums.

The noise light is disadvantageous in the following two aspects: (1) when light reflected from a polarization-separation device reaches a light source, it can result in instability in optical output; and (2) light leakage to other light-receiving member (in this example, another photosensitive drum) than a target light-receiving member (in this example, target photosensitive drum) can occur. In order to overcome the disadvantage (1), it is preferable to arrange a polarizer such that the polarizer is tilted relative to incident light to prevent other outgoing light from the polarizer than effective outgoing light from returning back to the light source. In order to overcome the disadvantage (2), it is desirable to provide a shielding member that shields the other outgoing light from the polarizer than the effective outgoing light.

Figure 40:
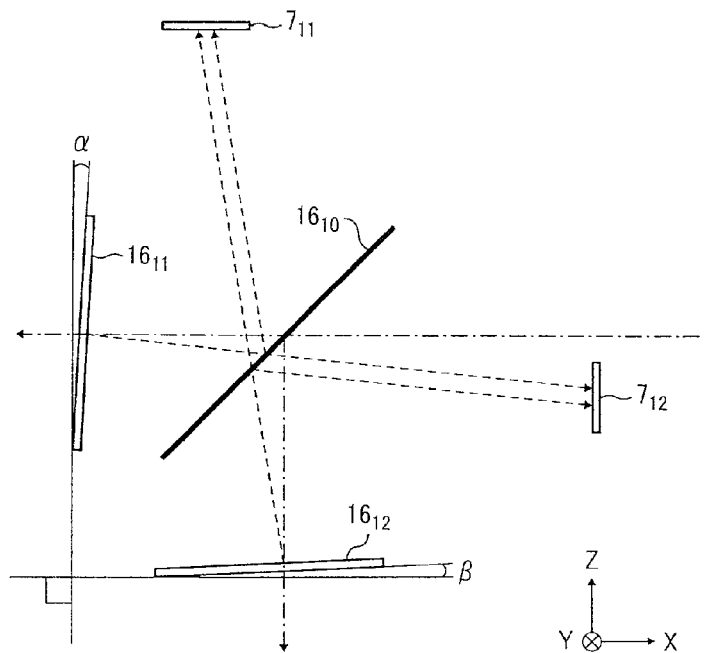
FIG. 40 is a diagram for describing relation between arrangement of two polarizers ($16_{11}$ and $16_{12}$) and unnecessary light exiting from the polarizers, and two shielding members ($7_{11}$ and $7_{12}$) provided to shield the unnecessary light.

In the first embodiment, as shown in FIG. 40, for instance, the polarizer $16_{11}$ is tilted an angle α relative to the Z-axis while the polarizer $16_{12}$ is tilted an angle β relative to the X-axis. The polarization-separation device $16_1$ is configured such that light reflected from the polarizer $16_{11}$ and light reflected from the polarizer $16_{12}$ are absorbed by a shielding member $7_{11}$ and a shielding member $7_{12}$.

Referring back to FIG. 3, a light beam (in this example, the light beam LBa), having transmitted through the polarization-separation device $16_1$, travels by way of the reflection mirror 18a, the anamorphic lens 19a, and the exit window 21a so as to illuminate the surface of the photosensitive drum 2030a, thereby forming a light spot. The light spot moves in the longitudinal direction of the photosensitive drum 2030a as the polygon mirror 14 rotates. In other words, the light spot scans the surface of the photosensitive drum 2030a. The direction in which the light spot moves in this manner is the "main-scanning direction" of the photosensitive drum 2030a, while the direction in which the photosensitive drum 2030a rotates is the "sub-scanning direction" of the photosensitive drum 2030a.

A scanning optical system for the "K station" is thus constructed of the fθ lens $15_1$, the polarization-separation device $16_1$, the reflection mirror 18a, and the anamorphic lens 19a.

Meanwhile, a light beam (in this example, the light beam LBb), reflected by the polarization-separation device $16_1$ in the negative Z direction, is reflected by the reflecting mirror $17_1$ in the negative X direction and travels by way of the reflection mirror $18b_1$, the reflection mirror $18b_2$, the anamorphic lens 19b, and the exit window 21b so as to illuminate the surface of the photosensitive drum 2030b, thereby forming a light spot. The light spot moves in the longitudinal direction of the photosensitive drum 2030b as the polygon mirror 14 rotates. In other words, the light spot scans the surface of the photosensitive drum 2030b. The direction in which the light spot moves in this manner is the "main-scanning direction" of the photosensitive drum 2030b, while the direction in which the photosensitive drum 2030b rotates is the "sub-scanning direction" of the photosensitive drum 2030b.

A scanning optical system for the "C station" is constructed of the fθ lens $15_1$, the polarization-separation device $16_1$, the reflecting mirror $17_1$, the reflection mirror $18b_1$, the reflection mirror $18b_2$, and the anamorphic lens 19b.

Accordingly, the fθ lens $15_1$ and the polarization-separation device $16_1$ are used by the two image forming stations in a sharing manner.

Referring back to FIG. 2, the fθ lens $15_2$ is arranged on the positive side of the polygon mirror 14 in the X direction as well as in an optical path of light beams passed through the cylindrical lens $12_2$ and then deflected by the polygon mirror 14.

Figure 41:
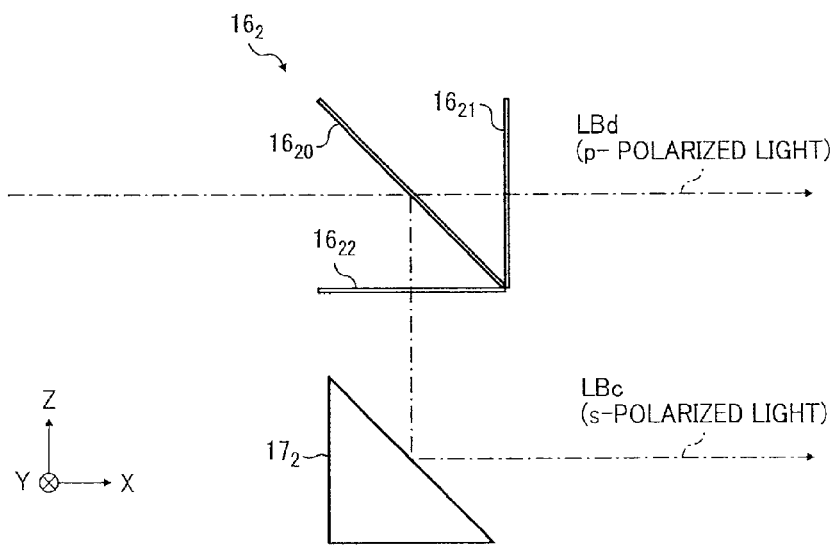
FIG. 41 is a diagram for describing the configuration of a polarization-separation device $16_2$.

As shown in FIG. 41, for instance, the polarization-separation device $16_2$ includes a beam splitter $16_{20}$ and two polarizers ($16_{21}$ and $16_{22}$).

The beam splitter $16_{20}$ is arranged on the positive side of the fθ lens $15_2$ in the X direction as well as in an optical path of light beams (the light beams LBc and the light beams LBd), having transmitted through the fθ lens $15_2$. The beam splitter $16_{20}$ is a beam splitter similar to the beam splitter $16_{10}$.

The polarizer $16_{21}$ is arranged on the positive side of the beam splitter $16_{20}$ in the X direction as well as in an optical path of light beams having transmitted through the beam splitter $16_{20}$. The polarizer $16_{22}$ is arranged on the negative side of the beam splitter $16_{20}$ in the Z direction as well as in an optical path of light beams reflected from the beam splitter $16_{20}$.

The polarizer $16_{21}$ is a polarizer similar to the polarizer $16_{11}$. The polarizer $16_{22}$ is a polarizer similar to the polarizer $16_{12}$.

Accordingly, majority of light beams that transmits through the polarization-separation device $16_2$ are the light beams LBd, and majority of light beams that are reflected from the polarization-separation device $16_2$ are the light beams LBc.

Referring back to FIG. 3, a light beam (in this example, the light beam LBc) reflected by the polarization-separation device $16_2$ in the negative Z direction is then reflected by the reflecting mirror $17_2$ in the positive X direction and travels by way of the reflection mirror $18c_1$, the reflection mirror $18c_2$, the anamorphic lens 19c, and the exit window 21c so as to illuminate the surface of the photosensitive drum $2030c$, thereby forming a light spot. The light spot moves in the longitudinal direction of the photosensitive drum $2030c$ as the polygon mirror 14 rotates. In other words, the light spot scans the surface of the photosensitive drum $2030c$. The direction in which the light spot moves in this manner is the "main-scanning direction" of the photosensitive drum $2030c$, while the direction in which the photosensitive drum $2030c$ rotates is the "sub-scanning direction" of the photosensitive drum $2030c$.

A scanning optical system for the "M station" is thus constructed of the fθ lens $15_2$, the polarization-separation device $16_2$, the reflecting mirror $17_2$, the reflection mirror $18c_1$, the reflection mirror $18c_2$, and the anamorphic lens $19c$.

Meanwhile, a light beam (in this example, the light beam LBd), having transmitted through the polarization-separation device $16_2$, travels by way of the reflection mirror $18d$, the anamorphic lens $19d$, and the exit window $21d$ so as to illuminate the surface of the photosensitive drum $2030d$, thereby forming a light spot. The light spot moves in the longitudinal direction of the photosensitive drum $2030d$ as the polygon mirror 14 rotates. In other words, the light spot scans the surface of the photosensitive drum $2030d$. The direction in which the light spot moves in this manner is the "main-scanning direction" of the photosensitive drum $2030d$, while the direction in which the photosensitive drum $2030d$ rotates is the "sub-scanning direction" of the photosensitive drum $2030d$.

A scanning optical system for the "Y station" is thus constructed of the fθ lens $15_2$, the polarization-separation device $16_2$, the reflection mirror $18d$, and the anamorphic lens $19d$.

Accordingly, the fθ lens $15_2$ and the polarization-separation device $16_2$ are used by the two image forming stations in a sharing manner. The reflection mirrors are arranged such that optical-path lengths of the image forming stations are equal to each other.

In the first embodiment, each of the fθ lenses is arranged between the polygon mirror and a corresponding one of the polarization-separation devices. Because the two optical paths are substantially superimposed on each other with respect to the Z-axis direction, each fθ lens can be used by the two stations in a sharing manner.

The scanning control device includes light-source control circuits respectively corresponding to and provided for the light sources. One of the light-source control circuits, corresponding to the light source $10a$ and the light source $10b$, is mounted on the circuit board of the light source unit LU1. The other one of the light-source control circuits, corresponding to the light source $10c$ and the light source $10d$, is mounted on the circuit board of the light source unit LU2.

As is clear from the above description, the beam splitter $16_{10}$, the polarizer $16_{11}$, and the polarizer $16_{12}$ of the polarization-separation device $16_1$ according to the first embodiment correspond to the beam splitter, the first polarizer, and the second polarizer according to an aspect of the present invention, respectively. Similarly, the beam splitter $16_{20}$, the polarizer $16_{21}$, and the polarizer $16_{22}$ of the polarization-separation device $16_2$ correspond to the beam splitter, the first polarizer, and the second polarizer according to an aspect of the present invention, respectively.

As for the polarization-separation device $16_1$, the light beam LBa corresponds to the first light beam and the light beam LBb corresponds to the second light beam. As for the polarization-separation device $16_2$, the light beam LBd corresponds to the first light beam and the light beam LBc corresponds to the second light beam.

As described above, the polarization-separation device $16_1$ according to the first embodiment includes the beam splitter $16_{10}$ that includes the beam-separating surface, on which each of the light beam LBa and the light beam LBb impinges at independently-varying incident angle, the polarizer $16_{11}$ that is arranged in the optical path of light beams having transmitted through the beam splitter $16_{10}$ and that allows the light beam LBa to transmit through the polarizer $16_{11}$, and the polarizer $16_{12}$ that is arranged in the optical path of light beams reflected from the beam splitter $16_{10}$ and that allows the light beam LBb to transmit through the polarizer $16_{12}$.

The beam-separating surface has light-separation characteristics that cause |Ts−Tp| and |Rs−Rp| to degrease as each of the angle θ1 and angle θ2 approaches 45 degrees, the angle θ1 ($0 \leq \theta1 \leq 90$) being between the incidence plane of the light beam LBa incident on the beam-separating surface and the polarization direction of the light beam LBa, and the angle θ2 ($0 \leq \theta2 \leq 90$) being between the incidence plane of the light beam LBb incident on the beam-separating surface and the polarization direction of the LBb.

The beam-separating surface has light-separation characteristics that cause |δ(rs, rp)| and |δ(ts, tp)| to degrease, as each of the angle θ1 and the angle θ2 approaches 45 degrees.

This allows separation between the light beam LBa and the light beam LBb to be performed more favorably than a conventional configuration.

The polarization-separation device $16_2$ according to the first embodiment includes: the beam splitter $16_{20}$ that includes the beam-separating surface, on which each of the light beam LBc and the light beam LBd impinges at independently-varying incident angle; the polarizer $16_{21}$ that is arranged in the optical path of light beams which are transmitted through the beam splitter $16_{20}$ and that allows the light beam LBd to transmit through the polarizer $16_{21}$; and the polarizer $16_{22}$ that is arranged in the optical path of light beams reflected from the beam splitter $16_{20}$ and that allows the light beam LBc to transmit through the polarizer $16_{22}$.

The beam-separating surface has light-separation characteristics that cause |Ts−Tp| and |Rs−Rp| to degrease, as each of the angle θ1 ($0 \leq \theta1 \leq 90$) between the incidence plane of the light beam LBd incident on the beam-separating surface and the polarization direction of the light beam LBd the angle θ2 ($0 \leq \theta2 \leq 90$) between the incidence plane of the light beam LBc incident on the beam-separating surface and the polarization direction of the light beam LBc approaches 45 degrees.

The beam-separating surface has light-separation characteristics that cause |δ(rs, rp)| and |δ(ts, tp)| to degrease, as each of the angle θ1 and the angle θ2 approaches 45 degrees.

This allows separation between the light beam LBc and the light beam LBd to be performed more favorably than a conventional configuration.

Each of the beam splitters ($16_{10}$, $16_{20}$) includes a transparent substrate, on one side of which the beam-separating surface is formed by depositing at least two types of dielectric layers of different refractive indices. The other side of the transparent substrate is coated with an anti-reflection film.

The polarizer $16_{11}$ is arranged such that a transmission axis of the polarizer $16_{11}$ is parallel to the Z-axis. The polarizer $16_{12}$ is arranged such that a transmission axis of the polarizer $16_{12}$ is parallel to the Y-axis. This arrangement minimizes the transmittance through the polarizer $16_{12}$ of linearly-polarized light that transmits through the polarizer $16_{11}$ at maximum transmittance.

Similarly, the polarizer $16_{21}$ is arranged such that a transmission axis of the polarizer $16_{21}$ is parallel to the Z-axis. The polarizer $16_{22}$ is arranged such that a transmission axis of the polarizer $16_{22}$ is parallel to the Y-axis. This arrangement minimizes the transmittance through the polarizer $16_{22}$ of linearly-polarized light that transmits through the polarizer $16_{21}$ at maximum transmittance.

Each of the polarizers is formed by sandwiching the polarizing film between the two transparent substrates ($16_{11}b$ and $16_{11}c$).

The optical scanning apparatus 2010 according to the first embodiment includes: the light source units (LU1 and LU2) that emit two light beams whose polarization directions differ from each other; the polygon mirror 14 that deflects each of the light beams from the light source units at substantially a constant angular velocity in the deflection plane; and the scanning optical system that includes the polarization-separation devices ($16_1$ and $16_2$), that separates the light beams deflected by the polygon mirror 14 by using the polarization-separation devices, and that causes each of the light beams to be converged on the surface of a corresponding one of the photosensitive drums.

Each of the polarization-separation devices is capable of separating the two light beams of different polarization directions more favorably than conventional polarization-separation devices. Accordingly, production of stray-light is reduced as compared with a conventional apparatus. This leads to stable suppression of production of stray-light without high additional cost nor upsizing.

Because the fθ lens and the polarization-separation device are used by the two image forming stations in a sharing manner, the optical scanning apparatus 2010 can be constructed compact.

Because one of the polarization of the two light sources is oriented to be perpendicular to the other one of the polarization of light source in each light source unit, an optical element for obtaining polarized light beams, whose polarization directions are perpendicular to each other, is not necessary any more. This leads to cost reduction.

Because the color printer 2000 according to the first embodiment includes the optical scanning apparatus 2010, the color printer 2000 is capable of forming a high-quality image without high additional cost while being constructed compact.

In the first embodiment, each light source unit can alternatively be configured to include, in place of the two light sources whose polarization direction are perpendicular to each other, a single light source whose polarization direction is to be switched at time intervals. In this configuration, an optical element that actively introduces an optical phase difference of λ/2 is preferably provided in an optical path between the light source and the polygon mirror 14. This reduces the number of light sources, thereby achieving compact configuration and cost reduction.

In the first embodiment, the beam-separating surface is formed with a dielectric multilayer film, but not limited thereto. For instance, the beam-separating surface can be formed with a wire grid. Note that when excellent wavefront aberration characteristics are required, the beam-separating surface is preferably formed with a dielectric multilayer film as in the first embodiment.

In the first embodiment, the beam splitter of the polarization-separation device is a plate-like splitter, but not limited thereto. For instance, the beam splitter of the polarization-separation device can alternatively have a cubic structure formed by sandwiching a beam-separating surface between two prism-like transparent members whose shape of cross sections each is a right isosceles triangle. It should be understood that such a structure of the beam splitter that includes the beam-separating surface on one surface of the substrate as in the first embodiment is more advantageous in that manufacturing process for the beam splitter of the first embodiment can be simple.

In the first embodiment, the difference between intensity of light transmitted through the beam splitter of the polarization-separation device and intensity of light reflected from the same, i.e., the difference between |Ts+Tp| and |Rs+Rp| is desirably small. When the difference is small, correction of light quantity among the photosensitive drums is facilitated or is not necessary any more.

In the first embodiment, one or more of the polarizers belonging to the polarization-separation device can be attached to the exit windows. This configuration eliminates the need of the transparent members attached to the exit windows and hence leads to reduction in the number of parts. This configuration is also advantageous in that the number of the optical elements arranged in the optical paths of light beams that exit the light sources toward the photosensitive drums can be reduced. Furthermore, the need of ensuring space for arranging the polarizers in the scanning optical system can be eliminated.

In the first embodiment, a polarizer belonging to the polarization-separation device can be formed integrally with the corresponding anamorphic lens. In this case, each polarizer is preferably attached to a flat-surface portion of the anamorphic lens.

In the first embodiment, no other optical element is interposed between the beam splitter and the polarizer that belong to the polarization-separation device; however, other optical element can be interposed between the beam splitter and the polarizer so long as the state of polarization is not changed by the other optical element interposed.

Figure 42:
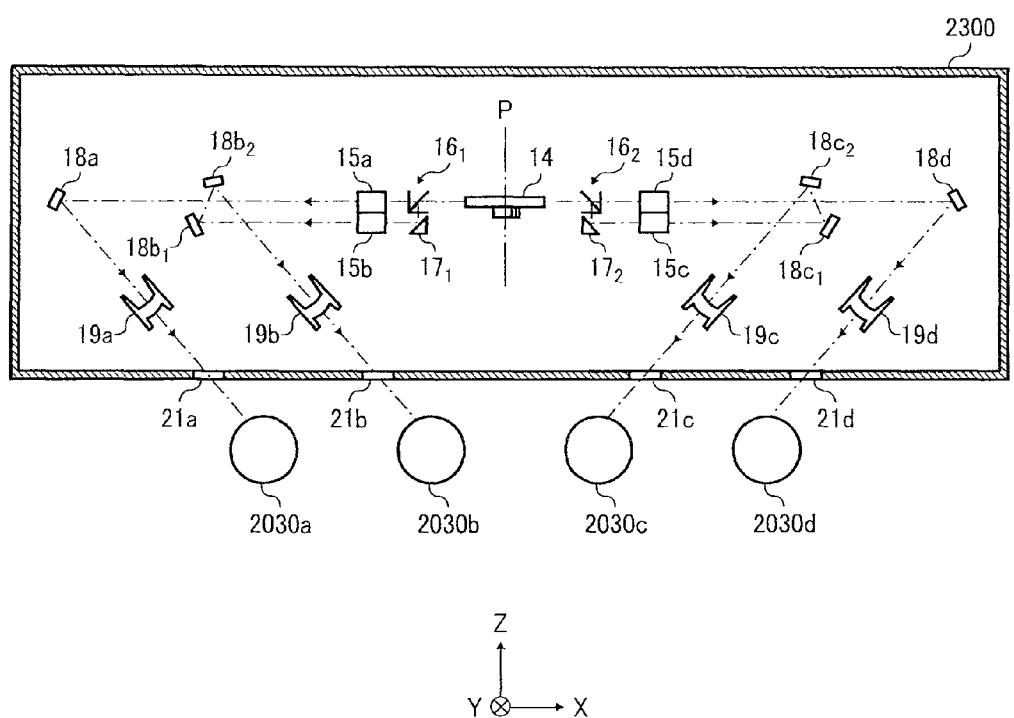
FIG. 42 is a diagram for describing a modification of a scanning optical system.

In the first embodiment, for instance, as shown in FIG. 42, each polarization-separation device can be arranged between the polygon mirror 14 and each fθ lens. However, to adopt this arrangement, it is necessary to additionally arrange an fθ lens 15a for the light beam LBa, an fθ lens 15b for the light beam LBb, an fθ lens 15c for the light beam LBc, and an fθ lens 15d for the light beam LBd. In this case, each of the fθ lenses can have a shape appropriate for polarization state, an optical path length, a position at which light is to be converged, and a scanning length of a corresponding light beam.

In the first embodiment, the beam-separating surface has light-separation characteristics that cause |Ts−Tp| and |Rs−Rp| to degrease as each of the angle θ1 and the angle θ2 approaches 45 degrees; however, the light-separation characteristics are not limited thereto. The beam-separating surface can have any light-separation characteristics so long as at least any one of |Ts−Tp| and |Rs−Rp| is reduced.

In the first embodiment, the beam-separating surface has light-separation characteristics that cause |δ(ts, tp)| and |δ(rs, rp)| to decrease as each of the angle θ1 and the angle θ2 approaches 45 degrees; however, the light-separation characteristics are not limited thereto. The beam-separating surface can have any light-separation characteristics so long as at least any one of |δ(ts, tp)| and |δ(rs, rp)| is reduced.

In the first embodiment, each light source includes a single light-emitting unit, but not limited thereto. For instance, each light source can include a plurality of semiconductor lasers. Alternatively, each light source can include a semiconductor laser array that includes a plurality of light-emitting units.

In the first embodiment, the image forming apparatus is the color printer 2000 that includes four photosensitive drums, but not limited thereto. For instance, the image forming apparatus can be a printer that includes two photosensitive drums. In this case, a single light source unit is to be employed.

As described above, a polarization-separation device according to an aspect of the present invention is suitable for separating light beams whose polarization directions are perpendicular to each other more favorably than a conventional polarization-separation device. An optical scanning apparatus according to an aspect of the present invention is suitable for suppressing production of stray-light stably without high additional cost nor capsizing. An image forming apparatus according to an aspect of the present invention is suitable for forming a high-quality image with a compact configuration without high additional cost.

<Second Embodiment>

A second embodiment of the present invention will be described with reference to the same drawings as those used to describe the first embodiment. Drawings and components common to the first embodiment are denoted by same reference drawing numbers, numerals, and symbols as those used in the first embodiment.

As described above, FIG. 10 illustrates the light beams LBa incident on the beam splitter $16_{10}$. Each of the light beams LBa is linearly-polarized light whose electric-field vector is parallel to the Z-axis irrespective of deflection angle. The incidence plane of the light beam LBa is parallel to the Z-axis when the principal ray of the light beam LBa is parallel to the X-axis, or put another way, when the deflection angle is 0 degrees; however, the incidence plane is tilted with greater degrees relative to the Z-axis as the absolute value of the deflection angle increases.

As absolute value of the deflection angle increases, p-polarized component decreases and s-polarized component increases (see Japanese Patent Application Laid-open No. 2009-157665).

In the description below, a light beam whose polarization direction is parallel to the Z-axis is referred to as "light beam A"; an angle between this polarization direction of the light beam A and incidence plane is referred to as $\theta 1$. Similarly, a light beam whose polarization direction is perpendicular to the Z-axis is referred to as "light beam B"; an angle between this polarization direction of the light beam B and incidence plane is referred to as $\theta 2$.

The polarizer $16_{11}$ is arranged such that its transmission axis lies parallel to the Z-axis so as to allow the light beam A to transmit through the polarizer $16_{11}$ but shield the light beam B.

The polarizer $16_{12}$ is arranged such that its transmission axis lies parallel to the Y-axis so as to allow the light beam B to transmit through the polarizer $16_{12}$ but shield the light beam A.

This configuration shields, as for the light beam A, most reflected light component reflected from the polarization-separation device $16_1$ is shielded; however, part of the reflected light component can leak and become stray-light (ghosting-light). Stray-light intensity ratio in the light beam A is defined as a ratio of light intensity of part of the light beam A reflected from the polarization-separation device to light intensity of part of the light beam A transmitted through the polarization-separation device.

Similarly, as for the light beam B, most transmitted light component transmitted through the polarization-separation device $16_1$ is shielded; however, part of the transmitted light component can leak and become stray-light. Stray-light intensity ratio in the light beam B is defined as a ratio of light intensity of part of the light beam B transmitted through the polarization-separation device to light intensity of part of the light beam B reflected from the polarization-separation device.

On an actual optical scanning apparatus, the range of the deflection angle is typically from −40 to +40 degrees. In the second embodiment, effective range of the deflection angle is set to be from −40 to +40 degrees. Because behavior of the polarization-separation device on incident light in the range of deflection angle of from −40 to 0 degrees and that in the range of deflection angle of from 0 to +40 degrees are in symmetric relation to each other, the behavior in a case where the range of deflection angle is from 0 to +40 degrees will be described below for convenience.

When the polarization direction is parallel to the Z-axis, the angles $\theta 1$ between the incidence plane and the polarization direction is: 0 degrees when the deflection angle is 0 degrees; and 32.7 degrees when the deflection angle is +40 degrees.

When the polarization direction is perpendicular to the Z-axis, the angles $\theta 2$ between the incidence plane and the polarization direction is: 90 degrees when the deflection angle is 0 degrees; and 57.2 degrees when the deflection angle is +40 degrees.

Meanwhile, the incident angles of a light beam incident on the beam splitter $16_{10}$ are: 45.0 degrees when the deflection angle is 0 degrees; and 57.2 degrees when the deflection angle is +40 degrees. Accordingly, when scanning of the surface of the photosensitive drum is to be performed with the deflection angle in the range of from 0 to +40 degrees, effective range of incident angle for the polarization-separation device $16_1$ is from 45.0 to 57.2 degrees.

Figure 43:
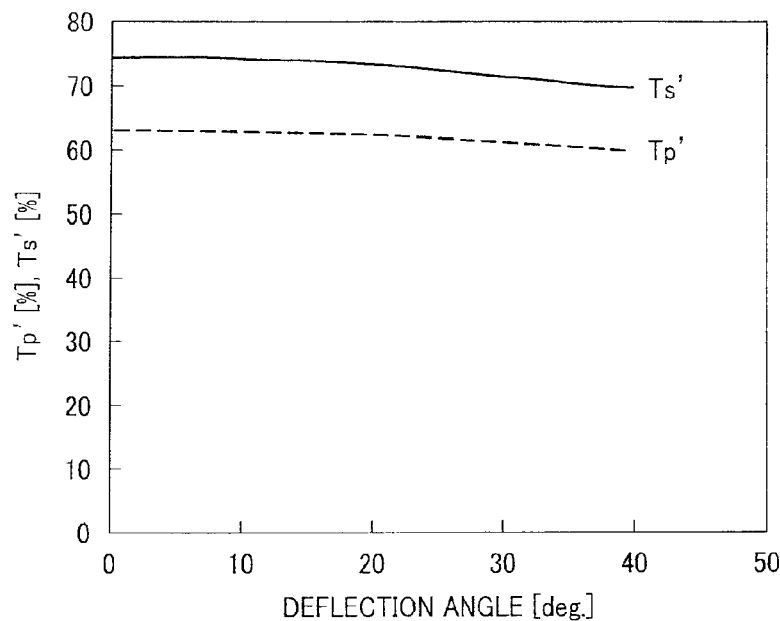
FIG. 43 is a diagram for describing relation between deflection angle of incident light, and Ts" and Tp" according to a second embodiment of the present invention.

Shown in FIG. 43 are relations between deflection angle, and Tp' that is optical transmittance of p-polarized component through the beam-separating surface of the beam splitter $16_{10}$ and Ts' that is optical transmittance of s-polarized component through the beam-separating surface. Within the deflection-angle range of from 0 to 40 degrees, values of Ts' are larger than values of Tp'. Because Tp' is not equal to Ts' in this example, rotation of polarization direction of light transmitted through the beam-separating surface occurs. This rotation of the polarization direction (polarization rotation) occurs at incident position where incident angle is other than 0 degrees in each case with the light beam A and with the light beam B.

Meanwhile, the optical transmittance Tp' of p-polarized component through the beam-separating surface can be calculated by using Equation (1) based on the intensity of light reflected from the beam splitter $16_{10}$ when the beam splitter $16_{10}$ is irradiated with p-polarized light, where Rp' is the reflectance of the p-polarized component in the beam-separating surface.

$$Tp'+Rp'=1 \quad (1)$$

Similarly, the optical transmittance Ts' of s-polarized component through the beam-separating surface can be calculated by using Equation (2) based on the intensity of light reflected from the beam splitter $16_{10}$ when the beam splitter $16_{10}$ is irradiated with s-polarized light, where Rs' is the reflectance of the s-polarized component in the beam-separating surface.

$$Ts'+Rs'=1 \quad (2)$$

The polarization rotation prevents part of the light beam A having transmitted through the beam-separating surface from transmitting through the polarizer $16_{11}$. This reduces efficiency for light utilization. In contrast, the polarization rotation allows part of the light beam B to transmit through the polarizer $16_{11}$. The thus-transmitted light becomes stray-light.

Figure 44:
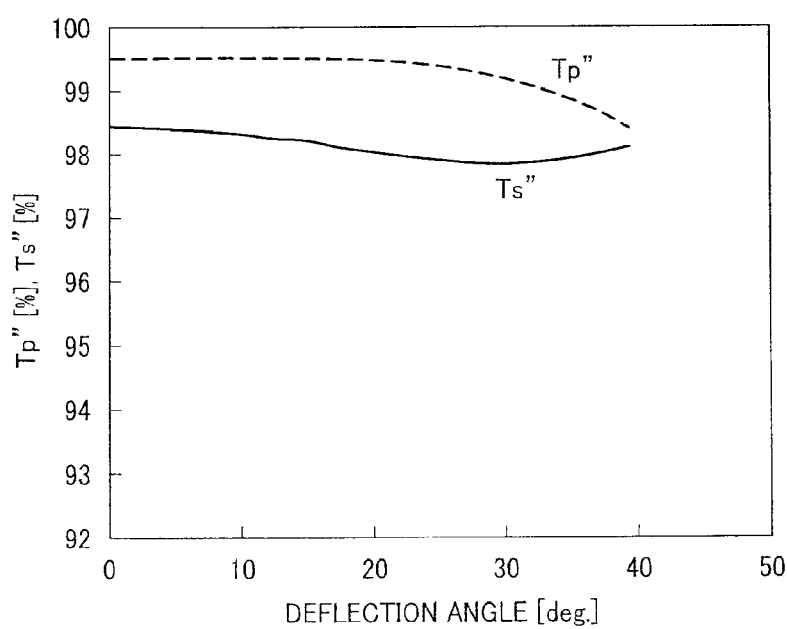
FIG. 44 is a diagram for describing relation between deflection angle of incident light, and Ts" and Tp" according to the second embodiment.

Shown in FIG. 44 are relations between deflection angle, and Tp" that is optical transmittance of p-polarized component through the anti-reflection film on the beam splitter $16_{10}$ and Ts" that optical transmittance of s-polarized component through the anti-reflection film. Although both Ts" and Ts" in FIG. 44 are of high values, the values of Tp" are greater than the values of Ts", which is contrary to the relation between Ts' and Tp'.

Figure 45:
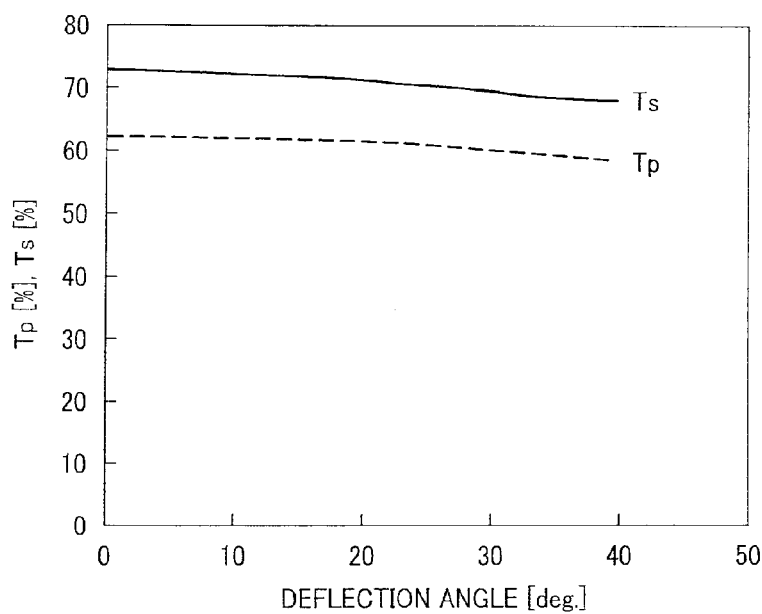
FIG. 45 is a diagram for describing relation between deflection angle of incident light, and Ts and Tp according to the second embodiment.

Shown in FIG. 45 are relations between deflection angle, and Tp that is optical transmittance through the beam splitter $16_{10}$ of p-polarized component, which transmits through any one of the beam-separating surface and the anti-reflection film, and Ts that is optical transmittance of s-polarized component through the beam splitter $16_{10}$. The relations can substantially be expressed by Tp=Tp'×Tp" and Ts=Ts'×Ts".

Figure 46:
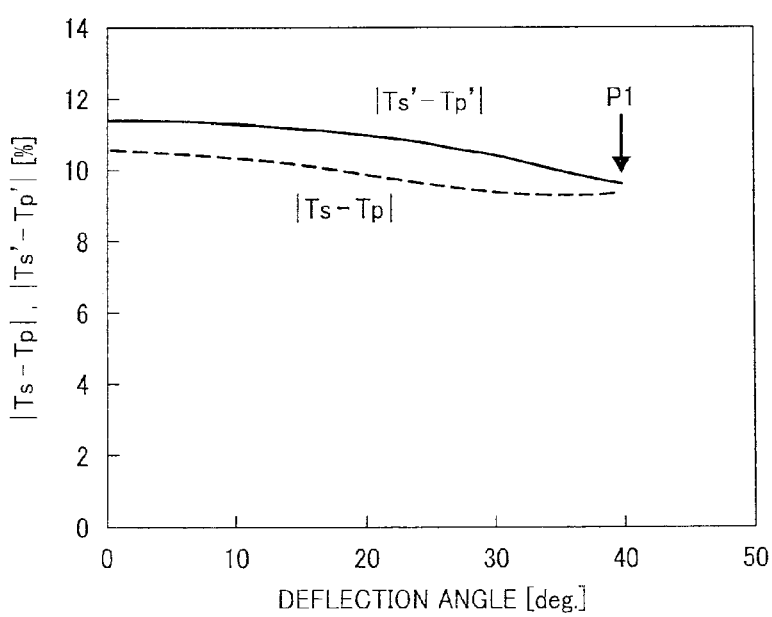
FIG. 46 is a diagram for describing relation between deflection angle of incident light, and |Ts−Tp| and |Ts'-Tp'| according to the second embodiment.

Relations between deflection angle, and |Ts−Tp| that is the absolute value of the difference between Ts and Tp, and |Ts'−Tp'| that is the absolute value of the difference between Ts' and Tp', are shown in FIG. 46. Referring to FIG. 46, |Ts−Tp| is smaller than |Ts"−Tp'|. P1 in FIG. 46 is a position where the angle θ1 is 32.7 degrees, where the angle θ1 is closest to 45 degrees within the effective range of incident angle.

Figure 47:
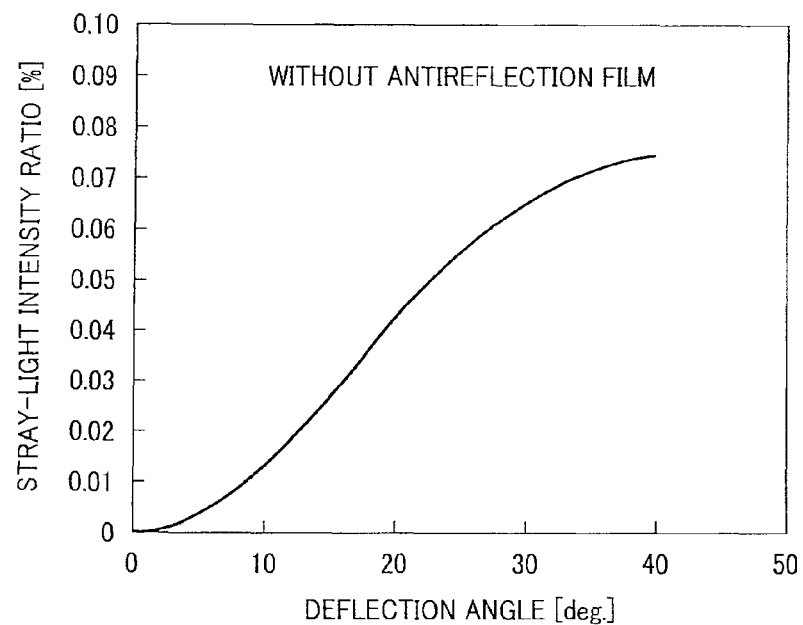
FIG. 47 is a diagram for describing relation between deflection angle of incident light, and stray-light intensity ratio obtained from Ts' and Tp' in the absence of an anti-reflection film according to the second embodiment.

Relation between deflection angle and stray-light intensity ratio obtained from Ts' and Tp' on an assumption that only the beam-separating surface is formed on the beam splitter $16_{10}$ but the anti-reflection film is not formed thereon is shown in FIG. 47.

Figure 48:
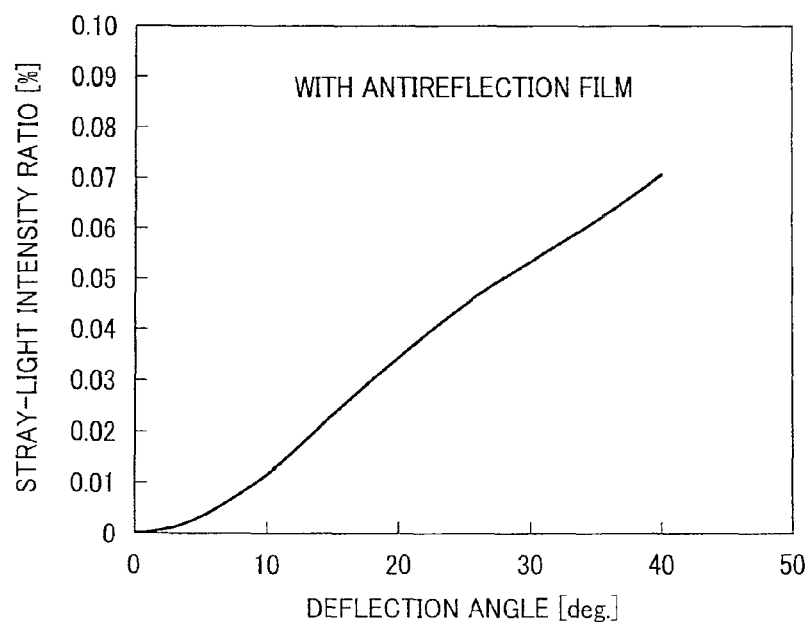
FIG. 48 is a diagram for describing relation between deflection angle of incident light, and stray-light intensity ratio obtained from Ts and Tp in the presence of the anti-reflection film according to the second embodiment.

Relation between deflection angle and stray-light intensity ratio obtained from Ts and Tp by using the beam splitter $16_{10}$, on which both the beam-separating surface and the anti-reflection film are formed, is shown in FIG. 48.

Comparison between FIG. 47 and FIG. 48 indicates that the presence of the anti-reflection film reduces amount of stray-light particularly in a range where the deflection angle is relatively large. The reason therefor is that |Ts−Tp| is smaller than |Ts'−Tp'| (see Japanese Patent Application Laid-open No. 2009-157665).

Within the effective range of incident angle, incident position where |Ts−Tp| is smaller than |Ts'−Tp'| with a large difference therebetween is a position where θ1 is equal to or closest to 45 degrees.

Accordingly, stray-light can be reduced most efficiently when θ1 at incident position is equal to or closest to 45 degrees within the effective range of incident angle.

Figure 49:
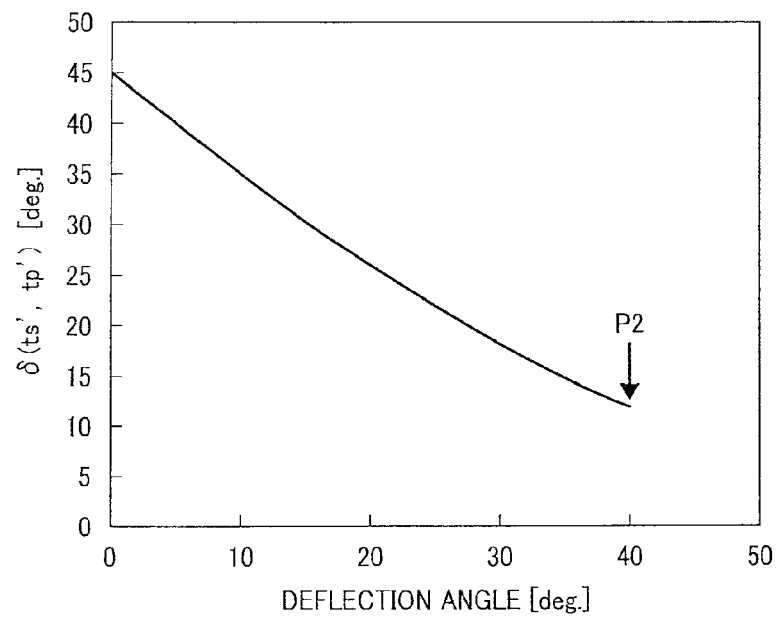
FIG. 49 is a diagram for describing relation between deflection angle of incident light and δ(ts', tp') according to the second embodiment.

Relation between deflection angle and the phase difference δ(ts', tp') between p-polarized component and s-polarized component that is introduced on the beam-separating surface of the beam splitter $16_{10}$ is shown in FIG. 49. Note that the phase difference is expressed as the difference with respect to a closest integral multiple of 2π.

Because the phase difference is not zero in this example, when incident light contains both p-polarized component and s-polarized component, light transmitted through the beam-separating surface is to undergo elliptical polarization. Incident light whose deflection angle is other than 0 degrees undergoes this elliptical polarization irrespective of whether the light is the light beam A or the light beam B.

The elliptical polarization prevents part of light beam A, having transmitted through the beam-separating surface, from transmitting through the polarizer $16_{12}$. This reduces efficiency for light utilization. In contrast, the elliptical polarization allows part of light beam B to transmit through the polarizer $16_{11}$. The thus-transmitted light becomes stray-light. P2 in FIG. 49 is a position where the angle θ1 is 32.7 degrees, where the angle θ1 is closest to 45 degrees within the effective range of incident angle.

Figure 50:
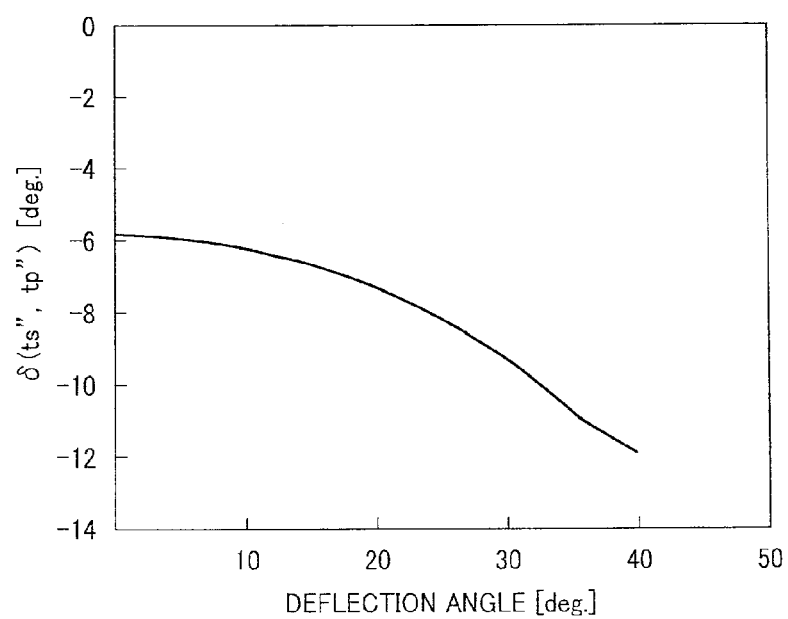
FIG. 50 is a diagram for describing relation between deflection angle of incident light and δ(ts", tp") according to the second embodiment.

Relation between deflection angle and the phase difference δ(ts", tp") between p-polarized component and s-polarized component that is introduced in the anti-reflection film of the beam splitter $16_{10}$ is shown in FIG. 50. δ(ts', tp') and δ(ts", tp") are of opposite sign.

Figure 51:
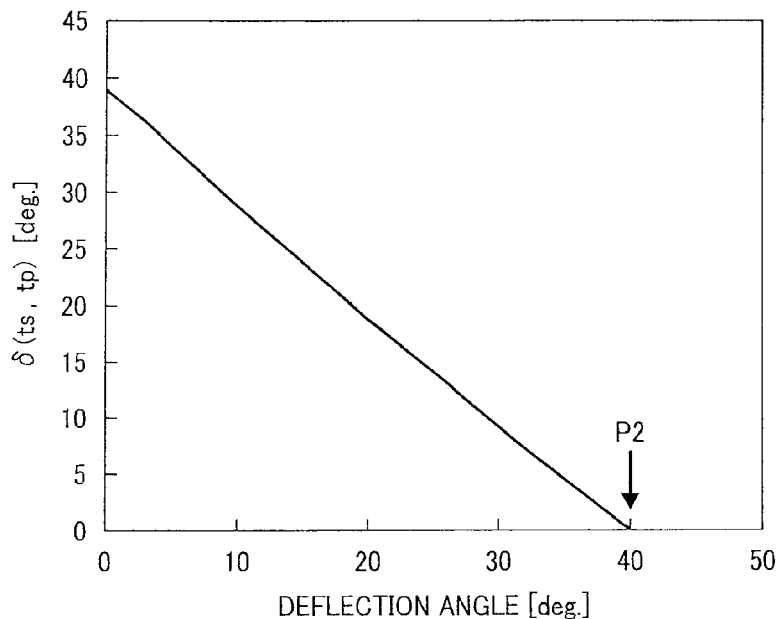
FIG. 51 is a diagram for describing relation between deflection angle of incident light and δ(ts, tp) according to the second embodiment.

Relation between deflection angle and phase difference δ(ts, tp) (referred to as "combined phase difference" for convenience) that is introduced to light having transmitted through the beam-separating surface of the beam splitter $16_{10}$ and further through the anti-reflection film is shown in FIG. 51. Because the principal axis direction is same, the relations can substantially be expressed by δ(ts, tp)=δ(ts', tp')+δ(ts", tp"). P2 in FIG. 51 is a position where the angle θ1 is 32.7 degrees, where the angle θ1 is closest to 45 degrees within the effective range of incident angle.

Comparison between FIG. 49 and FIG. 51 indicates that |Ts−Tp| that is the absolute value of the difference between Ts and Tp is smaller than |Ts'-Tp'| that is the absolute value of the difference between Ts' and Tp'.

Figure 52:
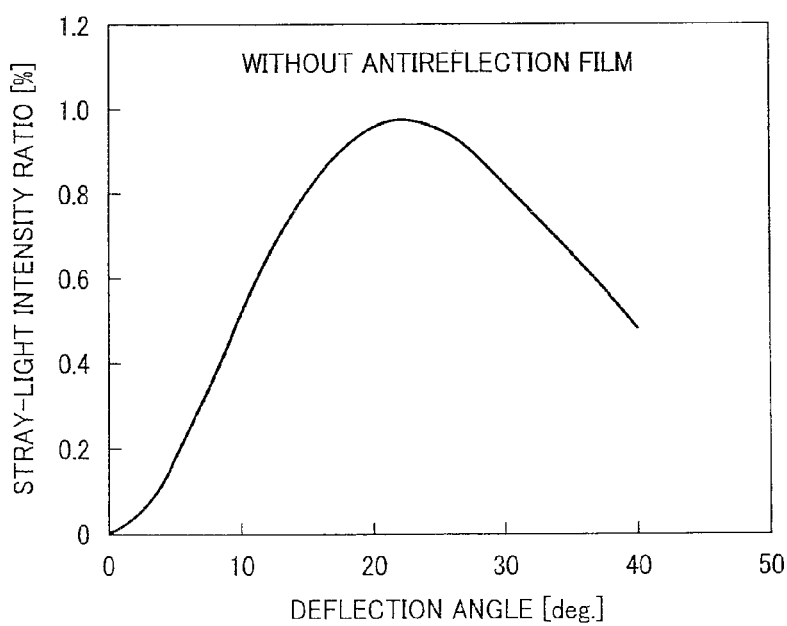
FIG. 52 is a diagram for describing relation between deflection angle of incident light, and stray-light intensity ratio obtained from Ts' and Tp' in the absence of the anti-reflection film according to the second embodiment.

Relation between deflection angle and stray-light intensity ratio obtained from δ(ts', tp') on an assumption that only the beam-separating surface is formed on the beam splitter $16_{10}$ but the anti-reflection film is not formed thereon is shown in FIG. 52.

Figure 53:
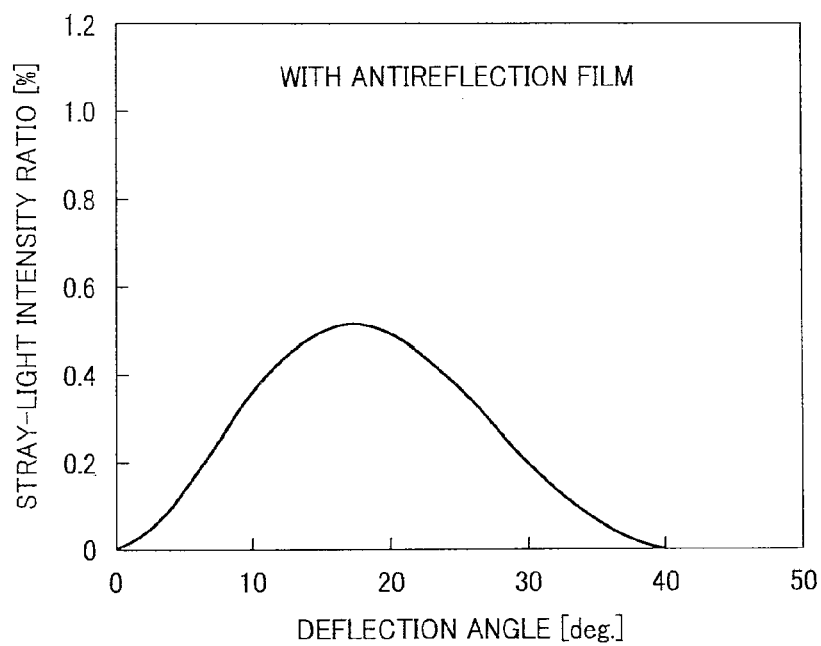
FIG. 53 is a diagram for describing relation between deflection angle of incident light, and stray-light intensity ratio obtained from Ts' and Tp' in the presence of the anti-reflection film according to the second embodiment.

Relation between deflection angle and stray-light intensity ratio obtained from δ(ts', tp') by using the beam splitter $16_{10}$, on which both the beam-separating surface and the anti-reflection film are formed, is shown in FIG. 53.

Comparison between FIG. 52 and FIG. 53 indicates that the presence of the anti-reflection film pronouncedly reduces each of stray-light intensity ratio at peak position and stray-light intensity ratio in a range where deflection angle is relatively large. The reason therefor is that |δ(ts, tp)| is smaller than |δ(ts', tp')| (see Japanese Patent Application Laid-open No. 2009-157665).

Within the effective range of incident angle, incident position where |δ(ts, tp)| is smaller than |δ(ts', tp')| with a large difference therebetween is a position where θ1 is equal to or closest to 45 degrees.

Accordingly, stray-light can be reduced most efficiently when θ1 at incident position is equal to or closest to 45 degrees within the effective range of incident angle.

From a practical point of view, the stray-light intensity ratio is preferably equal to or below 1% in consideration of exposure of the photosensitive drums. As is apparent from FIG. 48 and FIG. 53, with the beam splitter $16_{10}$, the stray-light intensity ratio is satisfactorily equal to or below 1% throughout a range in which approximately any possible deflection angle in the optical scanning apparatus falls.

A general polarizing film obtained by impregnating a film with iodine or dichroic dye and then monoaxially stretching the film can be used as each polarizer. In this example, as shown in FIG. 38, for instance, the polarizer $16_{11}$ is formed by sandwiching the polarizing film $16_{11}a$ between the two transparent substrates ($16_{11}b$ and $16_{11}c$), such as glass plates. This structure allows substantial improvement of wavefront aberration characteristics. When a higher extinction ratio is required, each polarizer can be a wire-grid polarizer, or a metal dispersion-type of polarizing film. The structure of the polarizer $16_{12}$ is similar to that of the polarizer $16_{11}$.

As shown in FIG. 39, in this example, it is assumed that majority of the light beams LBa, having transmitted through the beam splitter $16_{10}$, passes through the polarizer $16_{11}$. In contrast, majority of the light beams LBb having transmitted through the beam splitter $16_{10}$ is shielded by the polarizer $16_{11}$. Thus, the polarizer $16_{11}$ selectively allows only the light beams LBa, from among the light beams having transmitted through the beam splitter $16_{10}$, to transmit through the polarizer $16_{11}$.

Majority of the light beams LBb reflected from the beam splitter $16_{10}$ transmits through the polarizer $16_{12}$. In contrast, majority of the light beams LBa reflected from the beam splitter $16_{10}$ is shielded by the polarizer $16_{12}$. Thus, the polarizer $16_{12}$ selectively allows only the light beams LBb, from among the light beams reflected from the beam splitter $16_{10}$, to transmit through the polarizer $16_{12}$.

Meanwhile, the polarization-separation device $16_1$ is desirably configured to prevent a large amount of reflected light, which is produced by reflection from the polarizers, from becoming noise light. Unlike the stray-light that is light traveling toward different photosensitive drums than a target photosensitive drum, the noise light includes not only stray-light but also light that travels other directions than the directions toward the different photosensitive drums.

The noise light is disadvantageous in the following two aspects: (1) when light reflected from a polarization-separation device reaches a light source, it can result in instability in optical output; and (2) light leakage to other light-receiving member (in this example, another photosensitive drum) than a target light-receiving member (in this example, target photosensitive drum) can occur. Arranging a polarizer such that the polarizer is tilted relative to incident light to prevent other outgoing light from the polarizer than effective outgoing light from returning to the light source is effective to overcome the disadvantage (1). A shielding member that shields the other outgoing light from the polarizer than the effective outgoing light is desirably provided to overcome the disadvantage (2).

In the second embodiment, as shown in FIG. 40, for instance, the polarizer $16_{11}$ is tilted with the angle α relative to the X-axis, while the polarizer $16_{12}$ is tilted with the angle β relative to the Z-axis. The polarization-separation device $16_1$ is configured such that light reflected from the polarizer $16_{11}$ and light reflected from the polarizer $16_{12}$ are absorbed by a shielding member $7_{11}$ and a shielding member $7_{12}$.

Referring back to FIG. 3, a light beam (in this example, the light beam LBa), having transmitted through the polarization-separation device $16_1$, travels by way of the reflection mirror 18a, the anamorphic lens 19a, and the exit window 21a so as to illuminate the surface of the photosensitive drum 2030a, thereby forming a light spot. The light spot moves in the longitudinal direction of the photosensitive drum 2030a as the polygon mirror 14 rotates. In other words, the light spot scans the surface of the photosensitive drum 2030a. The direction in which the light spot moves in this manner is the "main-scanning direction" on the photosensitive drum 2030a, while the direction in which the photosensitive drum 2030a rotates is the "sub-scanning direction" on the photosensitive drum 2030a.

The scanning optical system for the "K station" is thus constructed of the fθ lens $15_1$, the polarization-separation device $16_1$, the reflection mirror 18a, and the anamorphic lens 19a.

Meanwhile, a light beam (in this example, the light beam LBb), reflected by the polarization-separation device $16_1$ in the negative Z direction, is reflected by the reflecting mirror $17_1$ in the negative X direction and travels by way of the reflection mirror $18b_1$, the reflection mirror $18b_2$, the anamorphic lens 19b, and the exit window 21b so as to illuminate the surface of the photosensitive drum 2030b, thereby forming a light spot. The light spot moves in the longitudinal direction of the photosensitive drum 2030b as the polygon mirror 14 rotates. In other words, the light spot scans the surface of the photosensitive drum 2030b. The direction in which the light spot moves in this manner is the "main-scanning direction" on the photosensitive drum 2030b, while the direction in which the photosensitive drum 2030b rotates is the "sub-scanning direction" on the photosensitive drum 2030b.

The scanning optical system for the "C station" is constructed of the fθ lens $15_1$, the polarization-separation device $16_1$, the reflecting mirror $17_1$, the reflection mirror $18b_1$, the reflection mirror $18b_2$, and the anamorphic lens 19b.

Accordingly, the fθ lens $15_1$ and the polarization-separation device $16_1$ are used by the two image forming stations in a sharing manner.

Referring back to FIG. 2, the fθ lens $15_2$ is arranged on the positive side of the polygon mirror 14 in the X direction as well as on the optical path of the light beams passed through the cylindrical lens $12_2$ and then deflected by the polygon mirror 14.

As shown in FIG. 41, for instance, the polarization-separation device $16_2$ includes the beam splitter $16_{20}$ and the two polarizers ($16_{21}$ and $16_{22}$).

The beam splitter $16_{20}$ is arranged on the positive side of the fθ lens $15_2$ in the X direction as well as in the optical path of the light beams (in this example, the light beam LBc and the light beam LBd) having passed through the f9 lens $15_2$. The beam splitter $16_{20}$ is a beam splitter similar to the beam splitter $16_{10}$.

The polarizer $16_{21}$ is arranged on the positive side of the beam splitter $16_{20}$ in the X direction as well as in the optical path of the light beams transmitted through the beam splitter $16_{20}$. The polarizer $16_{22}$ is arranged on the negative side of the beam splitter $16_{20}$ in the Z direction as well as in the optical path of the light beams reflected from the beam splitter $16_{20}$.

The polarizer $16_{21}$ is a polarizer similar to the polarizer $16_{11}$. The polarizer $16_{22}$ is a polarizer similar to the polarizer $16_{12}$.

Accordingly, majority of light beams that transmit through the polarization-separation device $16_2$ are the light beam LBd; and majority of light beams that are reflected from the polarization-separation device $16_2$ are the light beams LBc.

Referring back to FIG. 3, the light beam (in this example, the light beam LBc) reflected by the polarization-separation device $16_2$ in the negative Z direction is then reflected by the reflecting mirror $17_2$ in the positive X direction and travels by way of the reflection mirror $18c_1$, the reflection mirror $18c_2$, the anamorphic lens 19c, and the exit window 21c to illuminate the surface of the photosensitive drum 2030c, thereby forming a light spot. The light spot moves in the longitudinal direction of the photosensitive drum 2030c as the polygon mirror 14 rotates. In other words, the light spot scans the surface of the photosensitive drum 2030c. The direction in which the light spot moves in this manner is the "main-scanning direction" on the photosensitive drum 2030c; while the direction in which the photosensitive drum 2030c rotates is the "sub-scanning direction" on the photosensitive drum 2030c.

The scanning optical system for the "M station" is thus constructed of the fθ lens $15_2$, the polarization-separation device $16_2$, the reflecting mirror $17_2$, the reflection mirror $18c_1$, the reflection mirror $18c_2$, and the anamorphic lens 19c.

Meanwhile, the light beam (in this example, the light beam LBd) having transmitted through the polarization-separation device $16_2$ travels by way of the reflection mirror 18d, the anamorphic lens 19d, and the exit window 21d to illuminate the surface of the photosensitive drum 2030d, thereby forming a light spot. The light spot moves in the longitudinal direction on the photosensitive drum 2030d as the polygon mirror 14 rotates. In other words, the light spot scans the surface of the photosensitive drum 2030d. The direction in which the light spot moves in this manner is the "main-scanning direction" on the photosensitive drum 2030d while the direction in which the photosensitive drum 2030d rotates is the "sub-scanning direction" on the photosensitive drum 2030d.

The scanning optical system for the "Y station" is thus constructed of the fθ lens 15$_2$, the polarization-separation device 16$_2$, the reflection mirror 18d, and the anamorphic lens 19d.

Accordingly, the fθ lens 15$_2$ and the polarization-separation device 16$_2$ are used by the two image forming stations in a sharing manner. The reflection mirrors are arranged such that optical-path lengths of the image forming stations are equal to each other.

In the second embodiment, each of the fθ lenses is arranged between the polygon mirror and a corresponding one of the polarization-separation device. Because the two optical paths are substantially superimposed on each other with respect to the Z-axis direction, each fθ lens can be used by the two stations in a sharing manner.

The scanning control device includes light-source control circuits individually controlling the light sources. The light-source control circuits corresponding to the light source 10a and the light source 10b is mounted on the circuit board of the light source unit LU1. The light-source control circuits corresponding to the light source 10c and the light source 10d is mounted on the circuit board of the light source unit LU2.

As is clear from the above description, the beam splitter 16$_{10}$, the polarizer 16$_{11}$, and the polarizer 16$_{22}$ of the polarization-separation device 16$_1$ according to the second embodiment correspond to the beam splitter, the first polarizer, and the second polarizer according to an aspect of the present invention, respectively. Similarly, the beam splitter 16$_{20}$, the polarizer 16$_{21}$, and the polarizer 16$_{22}$ of the polarization-separation device 16$_2$ correspond to the beam splitter, the first polarizer and the second polarizer according to an aspect of the present invention, respectively.

As for the polarization-separation device 16$_1$, the light beam LBa corresponds to the first light beam and the light beam LBb corresponds to the second light beam. As for the polarization-separation device 16$_2$, the light beam LBd corresponds to the first light beam and the light beam LBc corresponds to the second light beam.

As described above, the polarization-separation device 16$_1$ according to the second embodiment includes the beam splitter 16$_{10}$ that includes the beam-separating surface, on which each of the light beam LBa and the light beam LBb impinges at independently-varying incident, angle, and the anti-reflection film that prevents the light beam LBa having transmitted through the beam-separating surface from being reflected, the polarizer 16$_{11}$ that is arranged in the optical path of light beams having transmitted through the beam splitter 16$_{10}$ and that allows the light beam LBa to transmit through the polarizer 16$_{11}$, and the polarizer 16$_{12}$ that is arranged in the optical path of light beams reflected from the beam splitter 16$_{10}$ and that allows the light beam LBb to transmit through the polarizer 16$_{12}$.

The polarization-separation device 16$_1$ is configured such that |Ts−Tp| is smaller than |Ts'−Tp'| at one or more incident positions that fall within the effective range of incident angle.

This allows separation between the light beam LBa and the light beam LBb to be performed more favorably than a conventional configuration.

The polarization-separation device 16$_2$ according to the second embodiment includes the beam splitter 16$_{20}$ that includes the beam-separating surface, on which each of the light beam LBc and the light beam LBd impinges at independently-varying incident angle, and the anti-reflection film that prevents the light beam LBa having transmitted through the beam-separating surface from being reflected, the polarizer 16$_{21}$ that is arranged in the optical path of light beams having transmitted through the beam splitter 16$_{20}$ and that allows the light beam LBa to transmit through the polarizer 16$_{21}$, and the polarizer 16$_{22}$ that is arranged in the optical path of light beams reflected from the beam splitter 16$_{20}$ and that allows the light beam LBc to transmit through the polarizer 16$_{22}$.

The polarization-separation device 16$_2$ is configured such that |Ts−Tp| is smaller than |Ts'−Tp'| at one or more incident positions that fall within the effective range of incident angle.

This allows separation between the light beam LBc and the light beam LBd to be performed more favorably than a conventional configuration.

The polarizer 16$_{11}$ is arranged such that the transmission axis of the polarizer 16$_{11}$ is parallel to the Z-axis. The polarizer 16$_{12}$ is arranged such that the transmission axis of the polarizer 16$_{12}$ is parallel to the Y-axis. This arrangement minimizes the transmittance through the polarizer 16$_{12}$ of linearly-polarized light that transmits through the polarizer 16$_{11}$ at maximum transmittance.

Similarly, the polarizer 16$_{21}$ is arranged such that the transmission axis of the polarizer 16$_{21}$ is parallel to the Z-axis. The polarizer 16$_{22}$ is arranged such that the transmission axis of the polarizer 16$_{22}$ is parallel to the Y-axis. This arrangement minimizes the transmittance through the polarizer 16$_{22}$ of linearly-polarized light that transmits through the polarizer 16$_{21}$ at maximum transmittance.

Each of the polarizers is formed by sandwiching the polarizing film by using the two transparent substrates (16$_{11}$b and 16$_{11}$c) therebetween.

The optical scanning apparatus 2010 according to the first embodiment includes the light source units (LU1 and LU2) that emit two light beams whose polarization directions differ from each other, the polygon mirror 14 that deflects each of the light beams emitted by the light source units at substantially a constant angular velocity in the deflection plane, and the scanning optical system that includes the polarization-separation devices (16$_1$ and 16$_2$), separates the light beams deflected by the polygon mirror 14 by using the polarization-separation devices, and causes each of the light beams to be converged on the surface of a corresponding one of the photosensitive drums.

Each of the polarization-separation devices is capable of separating the two light beams of different polarization directions more favorably than conventional polarization-separation device. Accordingly, production of stray-light is reduced as compared with a conventional apparatus. This leads to stable suppression of stray-light without high additional cost nor capsizing.

The fθ lens and the polarization-separation device are used by the two image forming stations in a sharing manner, so that the optical scanning apparatus 2010 can be constructed further compact.

Because one of the two light sources is oriented to be perpendicular to the other light source in each light source unit, an optical element for obtaining polarized light beams, whose polarization directions are perpendicular to each other, is not necessary any more. This leads to cost reduction.

Because the color printer 2000 according to the second embodiment includes the optical scanning apparatus 2010, the color printer 2000 is capable of forming a high-quality image without high additional cost while being constructed compact.

In the second embodiment, each light source unit can be configured to include, in place of the two light sources that are oriented to be perpendicular to each other, a single light source whose polarization direction is switched at time intervals. In this configuration, an optical element that actively introduces an optical phase difference of λ/2 is preferably provided in an optical path between the light source and the polygon mirror 14. This reduces the number of light sources, thereby achieving compact configuration and cost reduction.

In the second embodiment, the beam splitter of the polarization-separation device is a plate-like splitter, but not limited thereto. For instance, the beam splitter of the polarization-separation device can alternatively have a cubic structure formed by sandwiching a beam-separating surface between two prism-like transparent members each of whose cross sectional shapes is a right isosceles triangle. It should be understood that such a structure of the beam splitter that includes the beam-separating surface on one surface of the substrate as in the second embodiment is more advantageous in that manufacturing process for the beam splitter of the second embodiment can be simple.

In the second embodiment, the difference between intensity of light transmitted through the beam splitter of the polarization-separation device and intensity of light reflected from the same, i.e., the difference between |Ts+Tp| and |Rs+Rp| is desirably small. When the difference is small, correction of light quantity among the photosensitive drums is facilitated or becomes unnecessary.

In the second embodiment, one or more of the polarizers belonging to the polarization-separation device can be attached to the exit windows. This eliminates the need of the transparent members attached to the exit windows and hence leads to reduction in the number of parts. This configuration is also advantageous in that the number of the optical elements arranged in the optical paths of light beams that exit the light sources toward the photosensitive drums can be reduced. Furthermore, the need of ensuring space for arranging the polarizers in the scanning optical system can be eliminated.

In the second embodiment, one or more of the polarizers belonging to the polarization-separation device can be formed integrally with the corresponding one or more of the anamorphic lenses. In this case, each polarizer is preferably attached to a flat-surface portion of the anamorphic lens.

In the second embodiment, no other optical element is interposed between the beam splitter and the polarizer that belong to the polarization-separation device; however, other optical element can be interposed between the beam splitter and the polarizer so long as the state of polarization is not changed by the other optical element.

In the second embodiment, for instance, as shown in FIG. 42, each polarization-separation device can be arranged between the polygon mirror 14 and each fθ lens. However, to adopt this arrangement, it is necessary to additionally arrange the fθ lens 15a for the light beam LBa, the fθ lens 15b for the light beam LBb, the fθ lens 15c for the light beam LBc, and the fθ lens 15d for the light beam LBd. In this case, each of the fθ lenses can have a shape appropriate for polarization state, an optical path length, a position at which light is to be converged, and a scanning length of a corresponding light beam.

In the second embodiment, each light source includes a single light-emitting unit, but not limited thereto. For instance, each light source can include a plurality of semiconductor lasers. Alternatively, each light source can include a semiconductor laser array that includes a plurality of light-emitting units.

In the second embodiment, the image forming apparatus is the color printer 2000 that includes the four photosensitive drums, but not limited thereto. For example, the image forming apparatus can be a printer that includes two photosensitive drums. In this case, a single light source unit is to be employed.

As described above, a polarization-separation device according to an aspect of the present invention is suitable for separating light beams whose polarization directions are perpendicular to each other more favorably than conventional polarization-separation devices. A optical scanning apparatus according to an aspect of the present invention is suitable for suppressing production of stray-light stably without high additional cost nor upsizing. An image forming apparatus according to an aspect of the present invention is suitable for forming a high-quality image with a compact configuration without high additional cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A polarization-separation device comprising:
    a beam splitter that includes a beam-separating surface, on which a light beam that contains a first light beam and a second light beam impinges, wherein a polarization direction of the first light beam and a polarization direction of the second light beam are perpendicular to each other, and an incident angle of the first light beam and an incident angle of the second beam vary independently while incident onto the beam-separating surface;
    a first polarizer arranged in an optical path of transmitted light beams having transmitted through the beam splitter, and allows the first light beam to transmit therethrough; and
    a second polarizer arranged in an optical path of reflected light beams reflected from the beam splitter, and allows the second light beam to transmit therethrough,
    wherein, within an effective range of incident angle, at least any one of a value of |Ts−Tp| and a value of |Rs−Rp| obtained when an angle θ1 and an angle θ2 each being equal to or closest to 45 degrees is smaller than a corresponding one of a value of |Ts−Tp| and a value of |Rs−Rp| obtained when the angle θ1 and angle θ2 each being farthest from 45 degrees,
    the angle θ1 being angle between an incidence plane of the first light beam incident on the beam-separating surface and the polarization direction of the first light beam (0°≦θ1≦90°),
    the angle θ2 being an angle between an incidence plane of the second light beam incident on the beam-separating surface and the polarization direction of the second light beam (0°≦θ2≦90°),
    Tp being transmittance of p-polarized component transmitted through the beam-separating surface,
    Rp being reflectance of the p-polarized component reflected from the beam-separating surface,
    Ts being transmittance of s-polarized component transmitting through the beam-separating surface, and
    Rs being reflectance of the s-polarized component reflected from the beam-separating surface.

2. The polarization-separation device according to claim 1, wherein at least any one of |Ts−Tp| and |Rs−Rp| decreases as each of the angle θ1 and the angle θ2 approaches 45 degrees within the effective range of incident angle.

3. The polarization-separation device according to claim 1, wherein, within the effective range of incident angle, at least any one of a value of |δ̄ (rs, rp)| and a value of |δ̄ (ts, tp)| obtained when the angle θ1 and angle θ2 each being equal to or closest to 45 degrees is smaller than a corresponding one of a value of |$\bar{o}$ (rs, rp)| and a value of |$\bar{o}$ (ts, tp)| obtained when the angle θ1 and angle θ2 each being farthest from 45 degrees, $\bar{o}$ (ts, tp) being phase difference between s-polarized component and p-polarized component contained in a light beam having transmitted through the beam splitter, and $\bar{o}$ (rs, rp) being phase difference between s-polarized component and p-polarized component contained in a light beam reflected from the beam splitter.

4. The polarization-separation device according to claim 3, wherein, within the effective range of incident angle, at least any one of |$\bar{o}$ (ts, tp)| and |$\bar{o}$ (rs, rp)| decreases as each of the angle θ1 and the angle θ2 approaches 45 degrees.

5. The polarization-separation device according to claim 1, wherein the beam splitter includes a transparent substrate, and the beam-separating surface is a surface, on which at least two types of dielectric layers with different refractive indices are laminated, on one side of the transparent substrate.

6. The polarization-separation device according to claim 5, wherein a surface on the other side of the transparent substrate is coated with an anti-reflection film.

7. The polarization-separation device according to claim 1, wherein the first polarizer and the second polarizer are arranged for a linearly-polarized light to be minimized of transmittance through the second polarizer and to be maximized of the transmittance through the first polarizer.

8. An optical scanning apparatus that scans a plurality of scanned surfaces with light beams, the optical scanning apparatus comprising: a light source unit that emits a plurality of light beams that include a first light beam and a second light beam, wherein polarization direction of the first light beam and polarization direction of the second light beam are perpendicular to each other; a deflector that deflects the light beams from the light source unit; and a scanning optical system that includes the polarization-separation device according to claim 1 and separates the light beams deflected by the deflector by using the polarization-separation device so as to cause each of the light beams to be converged on a corresponding one of the scanned surfaces.

9. The optical scanning apparatus according to claim 8, wherein within an effective range of incident angle, direction of normal to the first polarizer at a position where an incident light beam impinges is not parallel to direction of principal ray of the incident light and direction of normal to the second polarizer at a position where an incident light beam impinges is not parallel to direction of principal ray of the incident light.

10. The optical scanning apparatus according to claim 8, further comprising a shielding member that shields light except for both effective outgoing light from the first polarizer of the polarization-separation device and effective outgoing light from the second polarizer.

11. The optical scanning apparatus according to claim 8, wherein the light source unit includes two light sources, one of the polarization direction of the two light sources being provided perpendicular to other one of the polarization direction of the two light sources.

12. An image processing apparatus comprising: a plurality of image carriers; and the optical scanning apparatus according to claim 8 that scans the image carriers with light beams.

13. The image processing apparatus according to claim 12, wherein the polarization direction of the first light beam and the polarization direction of the second light beam are perpendicular to each other, and the light beams deflected by the deflector are separated by using the polarization-separation device so as to cause each of the light beams to be converged onto a corresponding one of the scanned surfaces.

14. An optical scanning apparatus that scans a plurality of scanned surfaces with light beams, the optical scanning apparatus comprising: a light source that emits a plurality of light beams that include a first light beam and a second light beam, wherein a polarization direction of the first light beam and a polarization direction of the second light beam differ from each other; a deflector that deflects the light beams from the light source unit; and a scanning optical system that includes the polarization-separation device according to claim 1 and directs the first light beam and the second light beam onto each of the corresponding scanned surfaces.

15. The optical scanning apparatus of claim 14, wherein the polarization direction of the first light beam and the polarization direction of the second light beam are perpendicular to each other; and the light beams deflected by the deflector are separated by using the polarization-separation device so as to cause each of the light beams to be converged onto a corresponding one of the scanned surfaces.

16. A polarization-separation device comprising:
a beam splitter that includes a beam-separating light beam that contains a first light beam and a second light beam impinges, wherein a polarization direction of the first light beam and a polarization direction of the second light beam are perpendicular to each other, and an incident angle of the first light beam and an incident angle of the second beam vary independently while incident onto the beam-separating surface;
a first polarizer arranged in an optical path of transmitted light beams having transmitted through the beam splitter, and allows the first light beam to transmit therethrough; and
a second polarizer arranged in an optical path of reflected light beams reflected from the beam splitter, and allows the second light beam to transmit therethrough,
wherein the beam splitter includes: a transparent substrate that includes the beam-separating surface, on which the light beam that contains the first light beam and the second light beam impinges, wherein polarization direction of the first light beam and polarization direction of the second light beam are perpendicular to each other, and incident angle of the first light beam and incident angle of the second beam vary independently while incident onto the beam-separating surface; and
an anti-reflection film applied on an exit surface of the transparent substrate to prevent the first light beam from being reflected,
the exit surface being a face from which the light beam, having transmitted through the beam-separating surface of the transparent substrate, exits, and
|Ts−Tp| is smaller than |Ts'−Tp'| at at least one incident position P1 that falls within an effective range of incident angle,
Tp being optical transmittance through the beam splitter of p-polarized component that transmits through any one of the beam-separating surface and the anti-reflection film,
Ts being optical transmittance through the beam splitter of s-polarized component,
Tp' being optical transmittance through the beam-separating surface of the p-polarized component, and
Ts' being optical transmittance through the beam-separating surface of the s-polarized component.

17. The polarization-separation device according to claim 16, wherein the incident position P1 is a position where an angle θ1 is equal to or closest to 45 degrees, the angle θ1 being an angle between an incidence plane of the first light beam incident on the beam-separating surface and the polarization direction of the first light beam ($0° \leq \theta1 \leq 90°$).

18. The polarization-separation device according to claim 16, wherein a difference between $|\bar{o} (ts, tp)|$ and an integral multiple of $2n$ closest to $|\bar{o} (ts,tp)|$ is smaller than a difference between $|\bar{o} (ts', tp')|$ and an integral multiple of $2n$ closest to $|\bar{o} (ts', tp')|$ at least one incident position P2 that falls within the effective range of incident angle, the $\bar{o} (ts', tp')$ being an optical phase difference between s-polarized component and p-polarized component introduced in a light beam having transmitted through the beam-separating surface, $\bar{o} (ts'', tp'')$ being an optical phase difference between s-polarized component and p-polarized component introduced in a light beam having transmitted through the anti-reflection film, and $\bar{o} (ts, tp)$ being a combined phase difference of $\bar{o} (ts', tp')$ and $\bar{o} (ts'', tp'')$.

19. The polarization-separation device according to claim 18, wherein the incident position P2 is a position where the angle $\theta1$ is equal to or closest to 45 degrees.

20. The polarization-separation device according to claim 18, wherein the anti-reflection film is a film, in which at least two types of dielectric layers with different refractive indices are laminated.

21. An optical scanning apparatus that scans a plurality of scanned surfaces with light beams, the optical scanning apparatus comprising: a light source unit that emits a plurality of light beams that include a first light beam and a second light beam, wherein polarization direction of the first light beam and polarization direction of the second light beam are perpendicular to each other; a deflector that deflects the light beams from the light source unit; and a scanning optical system that includes the polarization-separation device according to claim 16 and separates the light beams deflected by the deflector by using the polarization-separation device so as to cause each of the light beams to be converged on a corresponding one of the scanned surfaces.

22. The optical scanning apparatus according to claim 21, wherein within an effective range of incident angle, direction of normal to the first polarizer at a position where an incident light beam impinges is not parallel to direction of principal ray of the incident light and direction of normal to the second polarizer at a position where an incident light beam impinges is not parallel to direction of principal ray of the incident light.

23. The optical scanning apparatus according to claim 21, further comprising a shielding member that shields light except for both effective outgoing light from the first polarizer of the polarization-separation device and effective outgoing light from the second polarizer.

24. The optical scanning apparatus according to claim 21, wherein the light source unit includes two light sources, one of the polarization direction of the two light sources being provided perpendicular to other one of the polarization direction of the two light sources.

25. An image processing apparatus comprising: a plurality of image carriers; and the optical scanning apparatus according to claim 21 that scans the image carriers with light beams.

* * * * *